United States Patent
Zhang et al.

(10) Patent No.: US 11,501,473 B2
(45) Date of Patent: Nov. 15, 2022

(54) SYSTEMS AND METHODS FOR IMAGE CORRECTION IN POSITRON EMISSION TOMOGRAPHY

(71) Applicant: SHANGHAI UNITED IMAGING INTELLIGENCE CO., LTD., Shanghai (CN)

(72) Inventors: Yang Zhang, Shanghai (CN); Yang Lyu, Shanghai (CN); Chen Xi, Shanghai (CN)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 389 days.

(21) Appl. No.: 16/728,081

(22) Filed: Dec. 27, 2019

(65) Prior Publication Data

US 2020/0211236 A1 Jul. 2, 2020

(30) Foreign Application Priority Data

Dec. 28, 2018 (CN) .......................... 201811630048.5

(51) Int. Cl.
*G06T 11/00* (2006.01)
*G06N 3/08* (2006.01)

(52) U.S. Cl.
CPC .............. *G06T 11/005* (2013.01); *G06N 3/08* (2013.01); *G06T 2211/428* (2013.01)

(58) Field of Classification Search
CPC ............. G06T 11/005; G06T 2211/428; G06T 2207/10104; G06N 3/08; A61B 6/037
See application file for complete search history.

(56) References Cited

U.S. PATENT DOCUMENTS

2017/0061629 A1* 3/2017 Zhu ..................... G06T 11/005
2017/0103287 A1* 4/2017 Han ........................ G06F 16/51

OTHER PUBLICATIONS

P. E. Kinahan et al., Attenuation Correction for a Combined 3D PET/CT Scanner, Med. Phys., 25(10): 2046-2053, 1998.
Chuanyong Bai et al., A Generalized Model for the Conversion from CT Numbers to Linear Attenuation Coefficients, IEEE Transactions on Nuclear Science, 50(5): 1188-1192, 2003.
A. Rahmin et al., Statistical Dynamic Image Reconstruction in State-of-the-art High-resolution PET, Phys. Med. Biol., 50(20): 4887-4912, 2005.

(Continued)

*Primary Examiner* — Tuan H Nguyen
(74) *Attorney, Agent, or Firm* — Metis IP LLC

(57) ABSTRACT

System for image correction in PET is provided. The system may acquire a PET image and a CT image of a subject. The system may generate, based on the PET image and the CT image, an attenuation-corrected PET image of the subject by application of an attenuation correction model. The attenuation correction model may be a trained cascaded neural network including a trained first model and at least one trained second model downstream to the trained first model. During the application of the attenuation correction model, an input of each of the at least one trained second model may include the PET image, the CT image, and an output image of a previous trained model that is upstream and connected to the trained second model.

20 Claims, 13 Drawing Sheets

(56) References Cited

OTHER PUBLICATIONS

S. D. Booth et al., Combined Diagonal/Fourier Preconditioning Methods for Image Reconstruction in Emission Tomography, Proc. IEEE International Conference on Image Processing, 2: 441-444, 1995.
F. Milletari et al., V-Net: Fully Convolutional Neural Networks for Volumetric Medical image Segmentation, 2016, 11 pages.
O. Ronneberger et al., U-net: Convolutional Networks for Biomedical Image Segmentation, 2015, 8 pages.
P. Isola et al., Image-to-Image Translation with Conditional Adversarial Networks. CVPR, 2017, 17 pages.
M. Arjovsky et al., Wasserstein Gan, 2017, 32 pages.

* cited by examiner

700

| Acquiring a plurality of training samples, each of the plurality of training samples including a sample PET image, a sample CT image of a sample subject, and a sample attenuation-corrected PET image corresponding to the sample PET image | 701 |

| Generating an attenuation correction model by training a cascaded neural network using the plurality of training samples | 703 |

SYSTEMS AND METHODS FOR IMAGE CORRECTION IN POSITRON EMISSION TOMOGRAPHY

CROSS-REFERENCE TO RELATED APPLICATIONS

This application claims priority of Chinese Patent Application No. 201811630048.5, filed on Dec. 28, 2018, the contents of which are hereby incorporated by reference.

TECHNICAL FIELD

The disclosure generally relates to image processing, and more particularly relates to systems and methods for image correction in positron emission tomography (PET) image reconstruction.

BACKGROUND

PET is widely used in disease diagnosis and/or treatment for various medical conditions (e.g., tumors, coronary heart diseases, or brain disease). During PET imaging, a radioactive tracer may be injected into a subject (e.g., a patient) without changing the physiological state of the subject. The radioactive tracer may participate in the physiological metabolism of the subject, and a PET scan may be performed to detect gamma rays emitted from the subject. A PET image of the subject may then be reconstructed based on PET data collected in the PET scan to evaluate the physiology (or functionality) functions of the subject.

Generally, during the reconstruction of the PET image, a series of data processing operations (e.g., an attenuation correction, a scatter correction, a statistical iterative reconstruction operation) may be performed on the PET data. Such operations may require mathematical modeling with a large amount of calculation. The reconstruction of the PET image may be time-consuming, for example, take 2-3 minutes, and a real-time browsing of the PET image can be hardly achieved. In addition, in the reconstruction process of PET image, a user may be unable to control the scan process in real-time because of lack of information regarding the current operating condition of the PET scanner and/or a real-time PET image, which may reduce the efficiency of the PET scan and result in a waste of resources. Therefore, it is desired to provide systems and methods for image correction in PET image reconstruction, thereby achieving instant browsing of PET images during the PET scan, improving the scan efficiency, and save resources.

SUMMARY

In an aspect of the present disclosure, a system for image correction in positron emission tomography (PET) is provided. The system may include at least one storage device including a set of instructions, and at least one processor configured to communicate with the at least one storage device. When executing the set of instructions, the system may be configured to direct the system to perform the following operations. The system may acquire a PET image and a computed tomography (CT) image of a subject. The system may also generate, based on the PET image and the CT image, an attenuation-corrected PET image of the subject by application of an attenuation correction model. The attenuation correction model may be a trained cascaded neural network including a plurality of trained models that are sequentially connected. The plurality of trained models may include a trained first model and at least one trained second model downstream to the trained first model. During the application of the attenuation correction model, an input of each of the at least one trained second model may include the PET image, the CT image, and an output image of a previous trained model that is upstream and connected to the trained second model.

In some embodiments, to generate an attenuation-corrected PET image of the subject by application of an attenuation correction model, the system may preprocess the CT image and the PET image. The system may generate a concatenated image by concatenating the preprocessed CT image and the preprocessed PET image. The system may obtain a preliminary attenuation-corrected PET image by inputting the concatenated image into the attenuation correction model. The system may also generate the attenuation-corrected PET image by processing the preliminary attenuation-corrected PET image.

In some embodiments, to preprocess the CT image and the PET image, the system may register the CT image with the PET image. The system may generate a resampled CT image and a resampled PET image by resampling the registered CT image and the registered PET image. Each of the resampled CT image and the resampled PET image may have a preset image resolution. The system may also generate the preprocessed CT image and the preprocessed PET image by normalizing the resampled CT image and the resampled PET image.

In some embodiments, to generate the attenuation-corrected PET image by processing the preliminary attenuation-corrected PET image, the system may denormalize the preliminary attenuation-corrected PET image. The system may also generate the attenuation-corrected PET image by resampling the denormalized preliminary attenuation-corrected PET image. The attenuation-corrected PET image and the PET image may have a same image resolution.

In some embodiments, the attenuation correction model may be trained using a plurality of sample attenuation-corrected PET images, and the denormalization of the preliminary attenuation-corrected PET image may be performed based on a mean value and a standard deviation of the plurality of sample attenuation-corrected PET images.

In some embodiments, to acquire a PET image and a CT image of a subject, the system may acquire CT image data and PET image data of the subject by performing a CT scan and a PET scan of the subject. The system may reconstruct, based on the CT image data, the CT image. The system may reconstruct, based on the PET image data, a preliminary PET image. The system may also generate the PET image by performing a random correction and a detector normalization on the preliminary PET image.

In some embodiments, at least one of the plurality of trained models may be a convolutional neural network (CNN) model or a generative adversarial network (GAN) model.

In some embodiments, the generation the attenuation-corrected PET image of the subject may be performed within 1 second.

In another aspect of the present disclosure, a system for generating an attenuation correction model is provided. The system may include at least one storage device including a set of instructions, and at least one processor configured to communicate with the at least one storage device. When executing the set of instructions, the system may be configured to direct the system to perform the following operations. The system may acquire a plurality of training samples, each of the plurality of training samples including a sample positron-emission tomography (PET) image of a sample subject, a sample computed tomography (CT) image of the sample subject, and a sample attenuation-corrected PET image corresponding to the sample PET image. The system may also generate the attenuation correction model by training a cascaded neural network using the plurality of training samples. The cascaded neural network may include a plurality of sequentially connected models. The plurality of models may include a first model and at least one second model downstream to the first model. During the training of the cascaded neural network, each of the at least one second model may be trained based on the plurality training samples and one or more models in the cascaded neural network upstream to the second model.

In some embodiments, the plurality of models may be trained in parallel during the training of the cascaded neural network. To train the cascaded neural network, The system may initialize parameter values of the cascaded neural network. The system may also train the cascaded neural network by iteratively updating the parameter values of the cascaded neural network based on the plurality of training samples.

In some embodiments, to iteratively update the parameter values of the cascaded neural network, the system may perform an iterative operation including one or more iterations. Each of at least one iteration of the iterative operation may include generating a predicted attenuation-corrected PET image by application of an updated cascaded neural network determined in a previous iteration for each of at least some of the plurality of training samples. Each of at least one iteration of the iterative operation may also include determining, based on the predicted attenuation-corrected PET image and the sample attenuation-corrected PET image of each of the at least some of the plurality of training samples, an assessment result of the updated cascaded neural network. Each of at least one iteration of the iterative operation may also include further updating the parameter values of the updated cascaded neural network to be used in a next iteration based on the assessment result. During the application of the updated cascaded neural network to a training sample, each second model of the updated cascaded neural network may be configured to receive the training sample and an output image of a previous model that is upstream and connected to the second model in the updated cascaded neural network, and the predicted attenuation-corrected PET image may be an output image of a last second model of the sequentially connected models in the updated cascaded neural network.

In some embodiments, the assessment result may be determined based on at least one of a difference between the predicted attenuation-corrected PET image and the sample attenuation-corrected PET image of each of at least some of the plurality of training samples, or a time needed for the updated cascaded neural network to generate the predicted attenuation-corrected PET image of each of the at least some of the plurality of training samples.

In some embodiments, to determine an assessment result of the updated cascaded neural network, for each of the plurality of models in the updated cascaded neural network, the system may determine, based on the sample attenuation-corrected PET image and an output image of the model corresponding to each of the at least some of the plurality of training samples, a value of a loss function corresponding to the model. The system may also determine, based on the values of the loss functions of the plurality of models, the assessment result.

In some embodiments, the parameter values of the cascaded neural network may include parameter values of each of the plurality of models, and the further updating the parameter values of the updated cascaded neural network based on the assessment result includes updating the parameter values of the model based on the value of the corresponding loss function for each of the plurality of models in the updated cascaded neural network.

In some embodiments, the training the cascaded neural network may include sequentially training the plurality of models. The first model may be trained using the plurality of training samples. Each of the at least one second model may be trained using the plurality of training samples and one or more trained models generated before the training of the second model.

In some embodiments, for each of the at least one second model, the training the second model may include generating a preliminary image by application of the one or more trained models generated before the training of the second model for each of the plurality of training samples. The training the second model may include initializing parameter values of the second model. The training the second model may also include training the second model by iteratively updating the parameter values of the second model based on the plurality of training samples and the corresponding preliminary images.

In some embodiments, the training the second model may include a second iterative operation including one or more iterations. Each of at least one iteration of the second iterative operation may include for each of at least some of the plurality of training samples, generating an output image of the second model by inputting the training sample and the corresponding preliminary image into an updated second model determined in a previous iteration. Each of at least one iteration of the second iterative operation may include determining, based on the output image of the updated second model and the sample attenuation-corrected PET image corresponding to each of the at least some of the plurality of training samples, a second assessment result. Each of at least one iteration of the second iterative operation may also include further updating the parameter values of the updated second model to be used in a next iteration based on the second assessment result.

In some embodiments, to generate the attenuation correction model by training a cascaded neural network using the plurality of training samples, for each of the plurality of training samples, the system may preprocess the sample PET image, the sample CT image, and the sample attenuation-corrected PET image of the training sample, and generate a sample concentrated image by concatenating the preprocessed sample CT image and the preprocessed sample PET image of the training sample. The system may also generate the attenuation correction model by training the cascaded neural network using the sample concatenated images and the plurality of preprocessed sample attenuation-corrected PET images.

In some embodiments, at least one of the plurality of models may be a convolutional neural network (CNN) model or a generative adversarial network (GAN) model.

In another aspect of the present disclosure, a method for image correction in positron emission tomography (PET) is provided. The method may be implemented on a computing device having at least one processor and at least one storage device. The method may include acquiring a PET image and a computed tomography (CT) image of a subject. The method may include generating, based on the PET image and the CT image, an attenuation-corrected PET image of the subject by application of an attenuation correction model. The attenuation correction model may be a trained cascaded neural network including a plurality of trained models that are sequentially connected. The plurality of trained models may include a trained first model and at least one trained second model downstream to the trained first model. During the application of the attenuation correction model, an input of each of the at least one trained second model may include the PET image, the CT image, and an output image of a previous trained model that is upstream and connected to the trained second model. The method may also include transmitting the attenuation-corrected PET image of the subject to a terminal for display.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 7 is a flowchart illustrating an exemplary process for generating an attenuation correction model according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
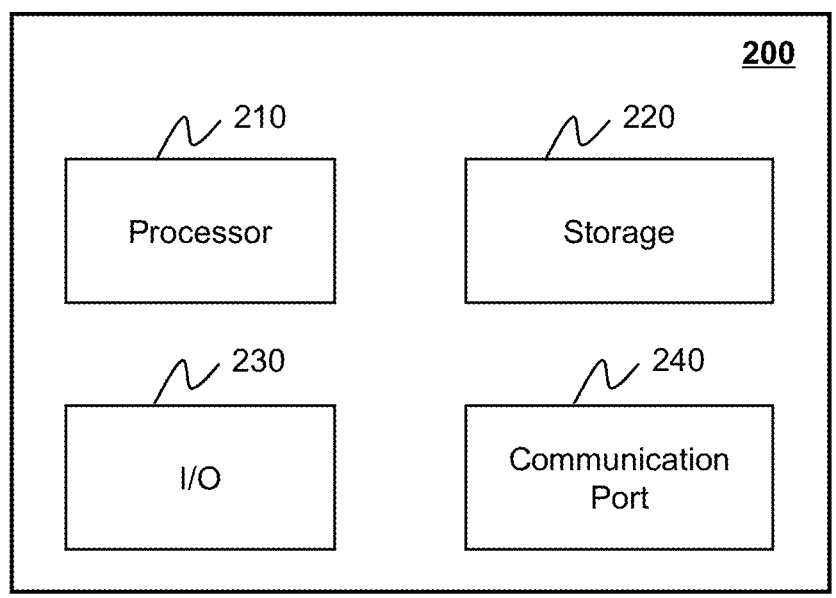
FIG. 2 is a schematic diagram illustrating hardware and/or software components of an exemplary computing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data) and/or images of various forms, including a two-dimensional (2D) image, a three-dimensional (3D) image, a four-dimensional (4D) image, etc. The term "pixel" and "voxel" in the present disclosure are used interchangeably to refer to an element of an image.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive biomedical imaging, such as for disease diagnostic or research purposes. In some embodiments, the systems may include a single modality imaging system and/or a multi-modality imaging system. The single modality imaging system may include, for example, a PET system and a computed tomography (CT) system. The multi-modality imaging system may include, for example, a positron emission tomography-computed tomography (PET-CT) system, etc. It should be noted that the imaging system described below is merely provided for illustration purposes, and not intended to limit the scope of the present disclosure.

The term "imaging modality" or "modality" as used herein broadly refers to an imaging method or technology that gathers, generates, processes, and/or analyzes imaging information of an object. The object may include a biological object and/or a non-biological object. The biological object may be a human being, an animal, a plant, or a portion thereof (e.g., a cell, a tissue, an organ, etc.). In some embodiments, the object may be a man-made composition of organic and/or inorganic matters that are with or without life. The term "object" or "subject" are used interchangeably.

An aspect of the present disclosure relates to systems and methods for image correction in PET. The systems and methods may acquire a PET image and a CT image of a subject. Based on the PET image and the CT image, the systems and methods may generate an attenuation-corrected PET image of the subject by application of an attenuation correction model. The attenuation correction model may be a trained cascaded neural network including a plurality of trained models that are sequentially connected. The plurality of trained models may include a trained first model and at least one trained second model downstream to the trained first model. During the application of the attenuation correction model, an input of each of the at least one trained second model may include the PET image, the CT image, and an output image of a previous trained model that is upstream and connected to the trained second model.

In some embodiments, the systems and methods for PET image correction may be applied during a PET scan of a subject. By applying the attenuation correction model, an attenuation corrected PET image of the subject may be reconstructed in a relatively high speed and an instant browsing of the attenuation-corrected PET image may be achieved, which may help a technician or doctor to adjust the scan process in real-time and improve the scan efficiency. As used herein, an instant (or real-time) browsing of an image during a PET scan refers to that the image is reconstructed and displayed on a terminal device when the PET scan is still performed or immediately after the PET scan is finished. For example, during the PET scan, PET data may be collected and transmitted to a processing device continuously or intermittently (e.g., periodically). The processing device may generate an attenuation-corrected PET image based on the PET data and update the attenuation-corrected PET image continuously or intermittently (e.g., periodically), wherein the generated or updated attenuation-corrected PET image may be displayed on the terminal device in real-time or substantially real-time. As another example, after the PET scan is finished, the processing device may generate an attenuation-corrected PET image based on PET data collected in the whole PET scan immediately (e.g., within a certain threshold period, such as 1 second, 2 seconds, 3 seconds, after the PET scan is finished), so as to achieve an instant browsing of the attenuation-corrected PET image.

Another aspect of the present disclosure relates to systems and methods for generating an attenuation correction model. The systems and methods may acquire a plurality of training samples. Each of the plurality of training samples may include a sample PET image of a sample subject, a sample CT image of the sample subject, and a sample attenuation-corrected PET image corresponding to the sample PET image. The systems and methods may also generate the attenuation correction model by training a cascaded neural network using the plurality of training samples. The cascaded neural network may include a plurality of sequentially connected models. The plurality of models may include a first model and at least one second model downstream to the first model. During the training of the cascaded neural network, each of the at least one second model may be trained based on the plurality training samples and one or more models in the cascaded neural network upstream to the second model.

According to some embodiments of the present disclosure, the cascaded neural network may be trained using the sample PET image and the sample CT image of each training sample. For a certain training sample, the corresponding sample CT image may have a relatively higher image contrast and/or a relatively higher density resolution, and the corresponding sample PET image may have more functional information. The sample CT image may facilitate the reconstruction of one or more structures (e.g., lung region, soft tissue, human epidermal tissue, etc.) in the sample PET image. By using both the sample PET image and the sample PET image as a training sample, the trained cascaded neural network (also referred to as the attenuation correction model) may combine features of the two images, thereby having a higher accuracy and reliability. In addition, in some embodiments, the reliability of the attenuation correction model may be further improved by adopting a deep auto-context learning strategy in training the cascaded neural network.

In some embodiments, the models of the cascaded neural network may be trained simultaneously and share one or more parameters (e.g., weights), which may reduce the size of the corresponding attenuation correction model and/or facilitate image reconstruction in applying the attenuation correction model. Optionally, the models of the cascaded neural network may include a plurality of 1*1 convolutional blocks, which may reduce the complexity of the attenuation correction model and further facilitate image reconstruction in applying the attenuation correction model. In addition, in applying the attenuation correction model, an input image (e.g., a PET image and/or a CT image of a subject) may be resampled to generate a resampled input image having an image resolution that corresponds to the attenuation correction model.

Figure 1:
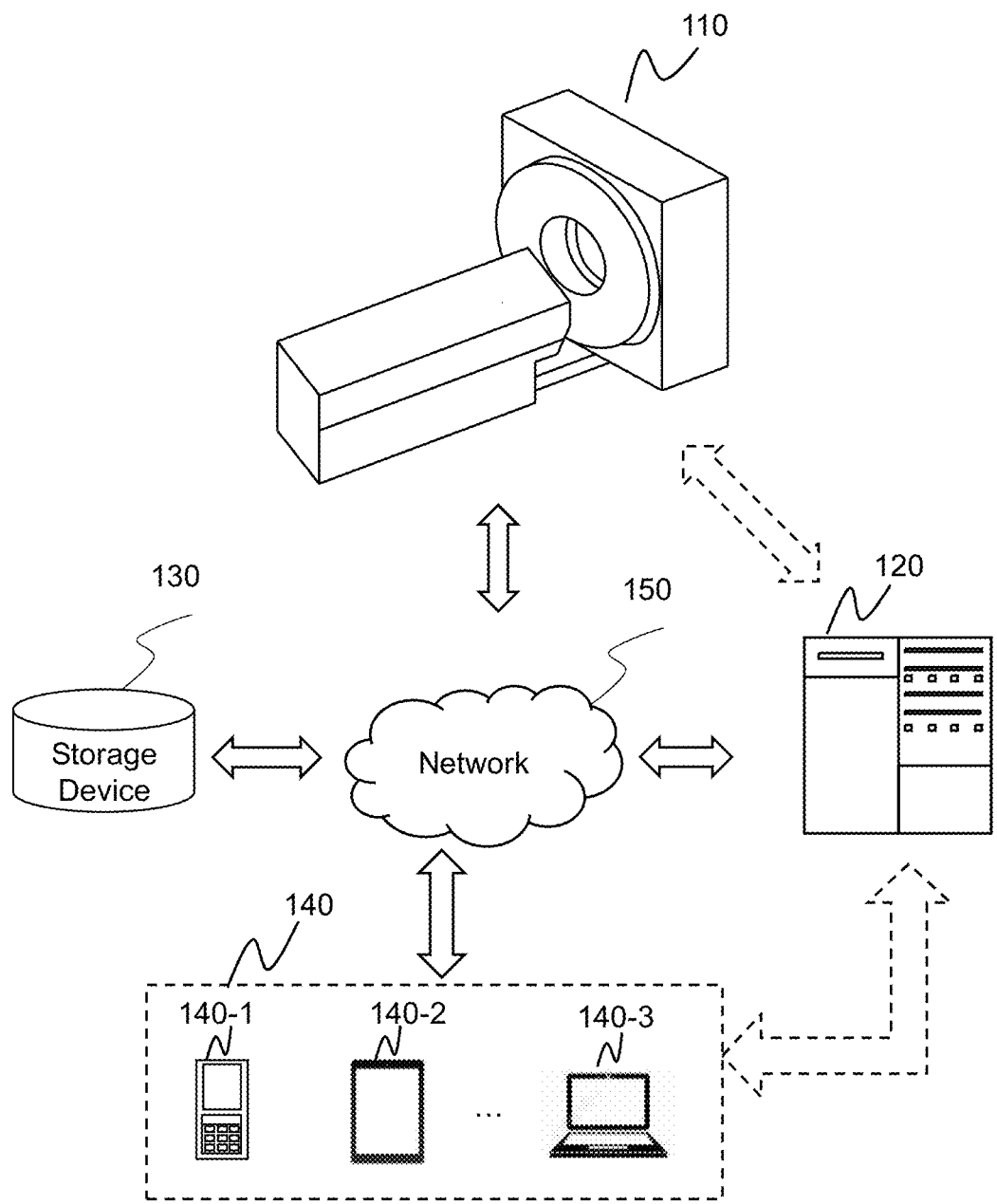
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. In some embodiments, the imaging system 100 may be a single-modality system (e.g., a PET system, a CT system) or a multi-modality system (e.g., a PET-CT system, such as a 2 m PET-CT). In some embodiments, the imaging system 100 may include modules and/or components for performing imaging and/or related analysis.

Merely by way of example, as illustrated in FIG. 1, the imaging system 100 may include an imaging device 110, a processing device 120, a storage device 130, one or more terminals 140, and a network 150. The components in the imaging system 100 may be connected in various ways. Merely by way of example, the imaging device 110 may be connected to the processing device 120 through the network 150 or directly as illustrated in FIG. 1. As another example, the terminal(s) 140 may be connected to the processing device 120 via the network 150 or directly as illustrated in FIG. 1.

The imaging device 110 may be configured to acquire imaging data relating to a subject. The imaging data relating to a subject may include an image (e.g., an image slice), projection data, or a combination thereof. In some embodiments, the imaging data may be two-dimensional (2D) imaging data, three-dimensional (3D) imaging data, four-dimensional (4D) imaging data, or the like, or any combination thereof. The subject may be biological or non-biological. For example, the subject may include a patient, a man-made object, etc. As another example, the subject may include a specific portion, organ, and/or tissue of the patient. For example, the subject may include the head, the neck, the thorax, the heart, the stomach, a blood vessel, soft tissue, a tumor, nodules, or the like, or any combination thereof.

In some embodiments, the imaging device 110 may include a PET device, a CT device, or a PET-CT device. The PET device may scan the subject or a portion thereof that is located within its detection region and generate projection data relating to the subject or the portion thereof. The PET device may include a gantry, a detector, an electronics module, and/or other components not shown. The gantry may support one or more parts of the PET device, for example, the detector, the electronics module, and/or other components. The detector may detect radiation photons (e.g., γ photons) emitted from the subject being examined. The electronics module may collect and/or process electrical signals (e.g., scintillation pulses) generated by the detector. The electronics module may convert an analog signal (e.g., an electrical signal generated by the detector) relating to a radiation photon detected by the detector to a digital signal relating to a radiation event. As used herein, a radiation event may refer to an interaction between a radiation photon emitted from a subject and impinging on and detected by the detector. A pair of radiation photons (e.g., γ photons) interacting with two detector blocks along a line of response (LOR) within a coincidence time window may be determined as a coincidence event. A portion of the radiation photons (e.g., γ photons) emitted from a subject being examined may interact with tissue in the subject. The radiation photons (e.g., γ photons) interacting with tissue in the subject may be scattered or otherwise change its trajectory, that may affect the number or count of radiation photons (e.g., γ photons) detected by two detector blocks along a line of response (LOR) within a coincidence time window and the number or count of coincidence events. The CT device may scan the subject or a portion thereof that is located within its detection region and generate CT image data relating to the subject or the portion thereof. The CT image data may be acquired by the CT device via scanning the subject using a radiation source (e.g., an X-ray source). The PET-CT device may include a PET component and a CT component. For example, the PET component may be used to provide functional and metabolic information of the subject (e.g., a lesion), and the CT component may be used to provide structural and anatomical information of the subject.

The processing device 120 may process data and/or information obtained from the imaging device 110, the terminal(s) 140, and/or the storage device 130. For example, the processing device 120 may correct a PET image by applying an attenuation correction model. As another example, the processing device 120 may generate the attenuation correction model by training a cascaded neural network using a plurality of training samples. In some embodiments, the generation and/or updating of the attenuation correction model may be performed on a processing device, while the application of the attenuation correction model may be performed on a different processing device. In some embodiments, the generation of the attenuation correction model may be performed on a processing device of a system different from the imaging system 100 or a server different from a server including the processing device 120 on which the application of the attenuation correction model is performed. For instance, the generation of the attenuation correction model may be performed on a first system of a vendor who provides and/or maintains such an attenuation correction model and/or has access to training samples used to generate the attenuation correction model, while image correction based on the provided attenuation correction model may be performed on a second system of a client of the vendor. In some embodiments, the generation of the attenuation correction model may be performed online in response to a request for image correction. In some embodiments, the generation of the attenuation correction model may be performed offline.

In some embodiments, the attenuation correction model may be generated and/or updated (or maintained) by, e.g., the manufacturer of the imaging device 110 or a vendor. For instance, the manufacturer or the vendor may load the attenuation correction model into the imaging system 100 or a portion thereof (e.g., the processing device 120) before or during the installation of the imaging device 110 and/or the processing device 120, and maintain or update the attenuation correction model from time to time (periodically or not). The maintenance or update may be achieved by installing a program stored on a storage device (e.g., a compact disc, a USB drive, etc.) or retrieved from an external source (e.g., a server maintained by the manufacturer or vendor) via the network 150. The program may include a new model (e.g., a new attenuation correction model) or a portion of a model that substitute or supplement a corresponding portion of the model.

In some embodiments, the processing device 120 may be a computer, a user console, a single server or a server group, etc. The server group may be centralized or distributed. In some embodiments, the processing device 120 may be local or remote. For example, the processing device 120 may access information and/or data stored in the imaging device 110, the terminal(s) 140, and/or the storage device 130 via the network 150. As another example, the processing device 120 may be directly connected to the imaging device 110, the terminal(s) 140 and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 130 may store data, instructions, and/or any other information. In some embodiments, the storage device 130 may store data obtained from the terminal(s) 140 and/or the processing device 120. For example, the storage device 130 may store image data (e.g., PET images, CT images, etc.) acquired by the imaging device 110. As another example, the storage device 130 may store one or more algorithms for processing the image data, an attenuation correction model for image correction, etc. In some embodiments, the storage device 130 may store data and/or instructions that the processing device 120 may execute or use to perform exemplary methods/systems described in the present disclosure. In some embodiments, the storage device 130 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the imaging system 100 (e.g., the processing device 120, the terminal(s) 140, etc.). One or more components in the imaging system 100 may access the data or instructions stored in the storage device 130 via the network 150. In some embodiments, the storage device 130 may be directly connected to or communicate with one or more other components in the imaging system 100 (e.g., the processing device 120, the terminal(s) 140, etc.). In some embodiments, the storage device 130 may be part of the processing device 120.

The terminal(s) 140 may include a mobile device 140-1, a tablet computer 140-2, a laptop computer 140-3, or the like, or any combination thereof. In some embodiments, the mobile device 140-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 140 may be part of the processing device 120.

The network 150 may include any suitable network that can facilitate the exchange of information and/or data for the imaging system 100. In some embodiments, one or more components of the imaging device 110 (e.g., a CT device, a PET device, etc.), the terminal(s) 140, the processing device 120, the storage device 130, etc., may communicate information and/or data with one or more other components of the imaging system 100 via the network 150. For example, the processing device 120 may obtain image data from the imaging device 110 via the network 150. As another example, the processing device 120 may obtain user instructions from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

It should be noted that the above description of the imaging system 100 is merely provided for the purposes of illustration, and not intended to limit the scope of the present disclosure. For persons having ordinary skills in the art, multiple variations and modifications may be made under the teachings of the present disclosure. For example, the imaging system 100 may include one or more additional components and/or one or more components of the imaging system 100 described above may be omitted. Additionally or alternatively, two or more components of the imaging system 100 may be integrated into a single component. A component of the imaging system 100 may be implemented on two or more sub-components.

FIG. 2 is a schematic diagram illustrating hardware and/or software components of an exemplary computing device 200 may be implemented according to some embodiments of the present disclosure. The computing device 200 may be used to implement any component of the imaging system as described herein. For example, the processing device 120 and/or a terminal 140 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (program codes) and perform functions of the processing device 120 in accordance with techniques described herein. The computer instructions may include, for example, routines, programs, objects, components, signals, data structures, procedures, modules, and functions, which perform particular functions described herein. For example, the processor 210 may perform attenuation correction on a PET image to generate an attenuation-corrected PET image. As another example, the processor 210 may generate an attenuation correction model according to a machine learning technique. In some embodiments, the processor 210 may perform instructions obtained from the terminal(s) 140. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the imaging device 110, the terminal(s) 140, the storage device 130, or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 120 for performing attenuation correction on a PET image.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the imaging device 110, the terminal(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
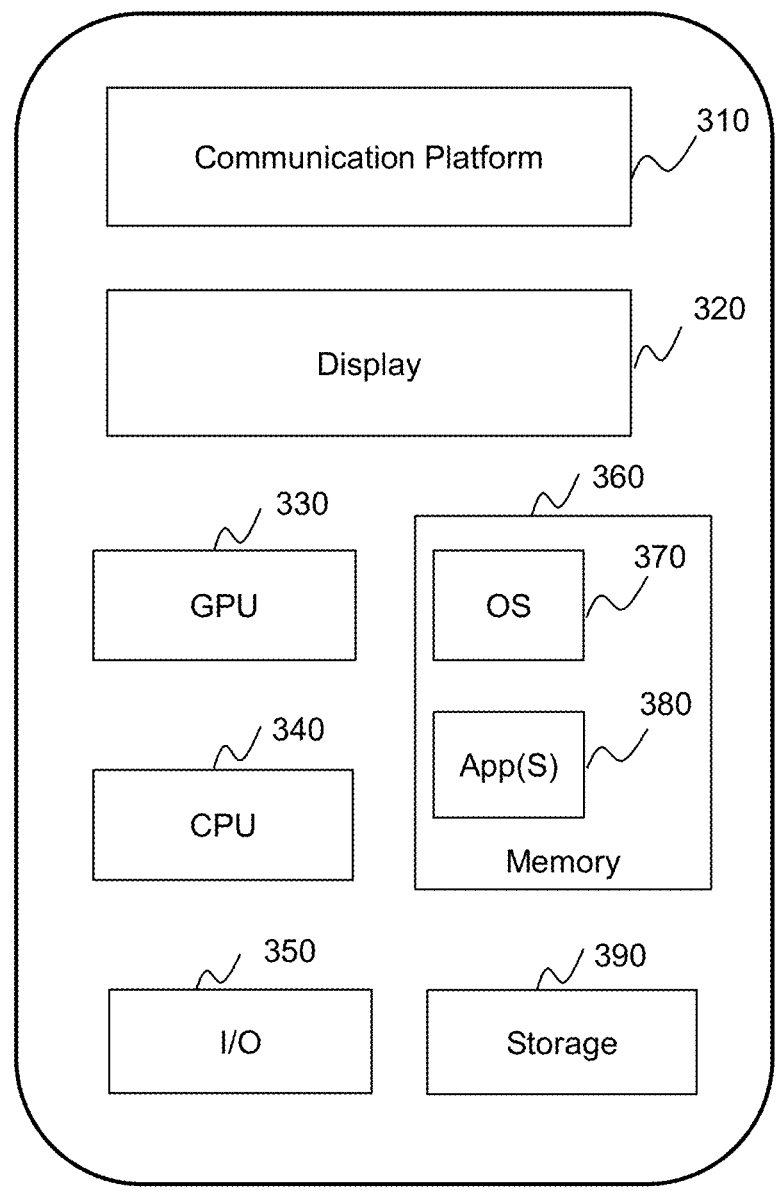
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. In some embodiments, one or more components (e.g., a terminal 140 and/or the processing device 120) of the imaging system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 120. User interactions with the information stream may be achieved via the I/O 350 and provided to the processing device 120 and/or other components of the imaging system 100 via the network 150.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4A:
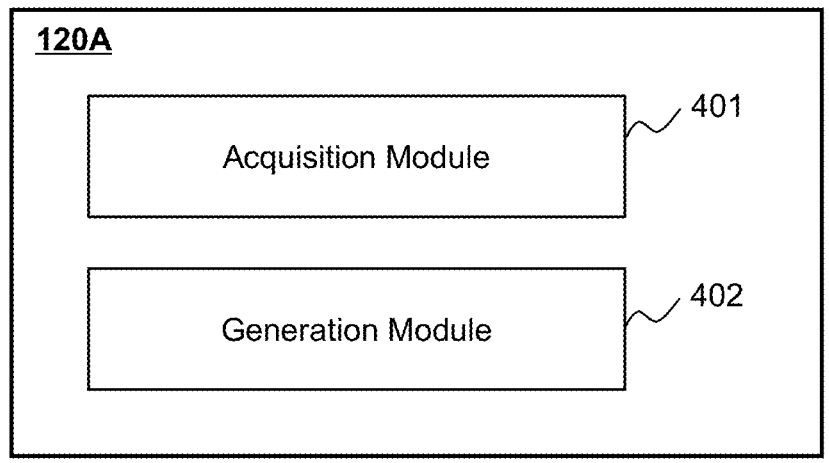
FIG. 4A and FIG. 4B are block diagrams illustrating exemplary processing devices according to some embodiments of the present disclosure.
Figure 4B:
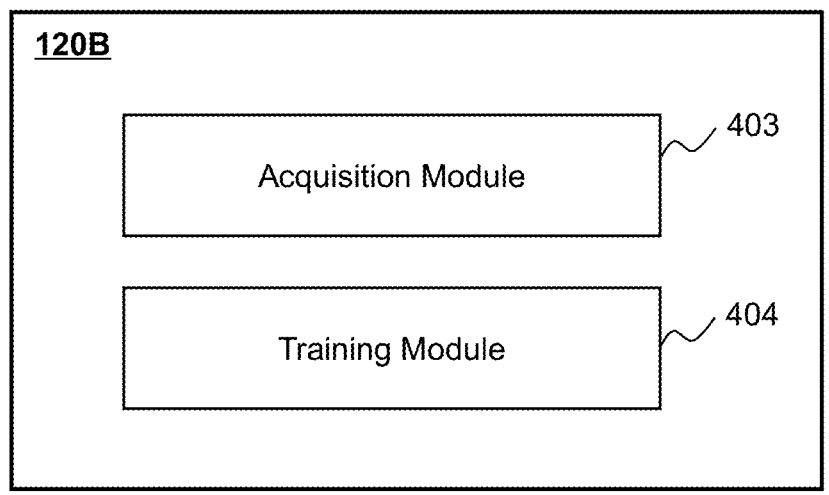

FIG. 4A and FIG. 4B are block diagrams illustrating exemplary processing devices 120A and 120B according to some embodiments of the present disclosure. In some embodiments, the processing devices 120A and 120B may be embodiments of the processing device 120 as described in connection with FIG. 1. In some embodiments, the processing devices 120A and 120B may be respectively implemented on a processing unit (e.g., the processor 210 illustrated in FIG. 2 or the CPU 340 as illustrated in FIG. 3). Merely by way of example, the processing devices 120A may be implemented on a CPU 340 of a terminal device, and the processing device 120B may be implemented on a computing device 200. Alternatively, the processing devices 120A and 120B may be implemented on a same computing device 200 or a same CPU 340. For example, the processing devices 120A and 120B may be implemented on a same computing device 200.

As illustrated in FIG. 4A, the processing device 120A may include an acquisition module 401 and a generation module 402.

The acquisition module 401 may be configured to acquire information relating to the imaging system 100. For example, the acquisition module 401 may acquire a PET image and a CT image of a subject from a storage device (e.g., the storage device 130, the storage 220, etc.). As another example, the acquisition module 401 may acquire CT image data and PET image data of the subject from a PET-CT scanner (e.g., a 2 m PET-CT scanner) that performs a CT scan and PET scan on the subject. As still another example, the acquisition module 401 may acquire an attenuation correction model from a storage device (e.g., the storage device 130, the storage 220, etc.) that stores the attenuation correction model.

The generation module 402 may be configured to generate an attenuation-corrected PET image of the subject based on the PET image and the CT image of the subject. For example, the generation module 402 may input the PET image and the CT image into the attenuation correction model, and the attenuation correction model may output the attenuation-corrected PET image. As another example, the generation module 402 may preprocess the CT image and the PET image of the subject. The generation module 402 may generate a concatenated image by concatenating the preprocessed CT image and the preprocessed PET image. The generation module 402 may obtain a preliminary attention-corrected PET image by inputting the concatenated image into the attenuation correction model, and generate the attenuation-corrected PET image by processing the preliminary attention-corrected PET image. More descriptions regarding the attenuation correction model and the generation of the attenuation-corrected PET image may be found elsewhere in the present disclosure (e.g., FIGS. 5-6 and the descriptions thereof).

As illustrated in FIG. 4B, the processing device 120B may include an acquisition module 403 and a training module 404.

The acquisition module 403 may be configured to acquire information and/or data for generating an attenuation correction model. For example, the acquisition module 403 may acquire a plurality of training samples. Each of the plurality of training samples may include a sample PET image of a sample subject, a sample CT image of the sample subject, and a sample attenuation-corrected PET image corresponding to the sample PET image. In some embodiments, the training samples may be previously generated and stored in a storage device (e.g., the storage device 130, the storage 220, the storage 390, or an external database). The acquisition module 403 may directly acquire the plurality of training samples from the storage device. In some embodiments, at least a portion of the training samples may be generated by the acquisition module 403. For example, the acquisition module 403 ma acquire sample image data from a storage device (e.g., the storage device 130, the storage 220, the storage 390, or an external database) and reconstruct the training samples based on the sample image data. More descriptions regarding the acquisition of the training samples may be found elsewhere in the present disclosure (e.g., operation 701 in FIG. 7 and the descriptions thereof).

The training module 404 may be configured to generate the attenuation correction model by training a cascaded neural network using the plurality of training samples. The cascaded neural network may include a plurality of sequentially connected models. The plurality of models may include a first model and at least one second model downstream to the first model. In some embodiments, the training module 404 may train the cascade neural network using a deep auto-correct learning strategy. For example, the training module 402 may train the models of the cascaded neural network in parallel. As another example, the training module 403 may train the models of the cascaded neural network sequentially. In some embodiments, before training the cascaded neural network, the training module 404 may preprocess the training samples by performing image registration, image resampling, image normalization, and image concatenation on the corresponding training samples. More descriptions regarding the generation of the attenuation correction model may be found elsewhere in the present disclosure (e.g., operation 703 in FIG. 7 and the description thereof).

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. Each of the modules described above may be a hardware circuit that is designed to perform certain actions, e.g., according to a set of instructions stored in one or more storage media, and/or any combination of the hardware circuit and the one or more storage media.

In some embodiments, the processing device 120A and/or the processing device 120B may share two or more of the modules, and any one of the modules may be divided into two or more units. For instance, the processing devices 120A and 120B may share a same acquisition module, that is, the acquisition module 401 and the acquisition module 403 are a same module. In some embodiments, the processing device 120A and/or the processing device 1206 may include one or more additional modules, such as a storage module (not shown) for storing data. In some embodiments, the processing device 120A and the processing device 120B may be integrated into one processing device 120.

Figure 5:
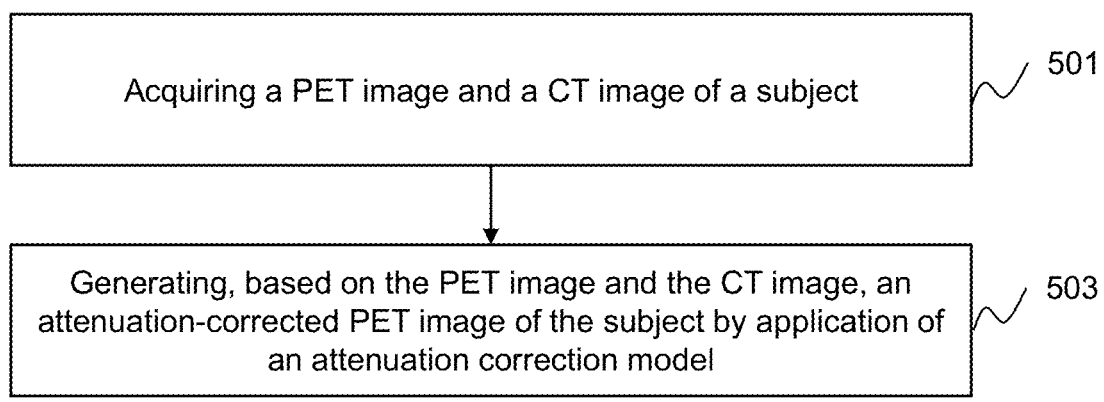
FIG. 5 is a flowchart illustrating an exemplary process for generating an attenuation-corrected PET image of a subject according to some embodiments of the present disclosure.

FIG. 5 is a flowchart illustrating an exemplary process 500 for generating an attenuation-corrected PET image of a subject according to some embodiments of the present disclosure. In some embodiments, process 500 may be implemented as a set of instructions (e.g., an application) stored in a storage device (e.g., the storage device 130, the storage 220, and/or the storage 390). The processing device 120A (e.g., the processor 210, the CPU 340, and/or one or more modules illustrated in FIG. 4A) may execute the set of instructions, and when executing the instructions, the processing device 120A may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 501, the processing device 120A (e.g., the acquisition module 401) may acquire a PET image and a CT image of a subject. The subject may be biological or non-biological. For example, the subject may include a patient, a man-made object, etc., as described elsewhere in the present disclosure (e.g., FIG. 1 and the descriptions thereof).

In some embodiments, the CT image and/or the PET image may be previously generated and stored in a storage device (e.g., the storage device 130, the storage 220, etc.), and the processing device 120A may retrieve the CT image and/or the PET image from the storage device. Alternatively, the CT image and/or the PET image may be generated by the processing device 120A. For example, a PET-CT scanner (e.g., a 2 m PET-CT scanner) may be directed to perform a CT scan and a PET scan on the subject to acquire CT image data and PET image data of the subject. The processing device 120A may reconstruct the CT image based on the CT image data according to a CT image reconstruction algorithm. Exemplary CT image reconstruction algorithms may include a Filter Back Projection (FBP) algorithm, an Algebraic Reconstruction Technique (ART), a Local Reconstruction Algorithm (LocalRA), or the like, or any combination thereof. The processing device 120A may reconstruct the PET image based on the PET image data according to a PET image reconstruction algorithm. Exemplary PET image reconstruction algorithms may include an ordered subset expectation maximization (OSEM) algorithm, a filtered back projection (FBP) algorithm, a maximum-likelihood reconstruction of attenuation and activity (MLAA) algorithm, or the like, or any combination thereof.

In some embodiments, the processing device 120A may reconstruct a preliminary PET image based on the PET image data, and generate the PET image by performing one or more correction operations (e.g., a random correction, a detector normalization, and/or a scatter correction) other than an attenuation correction operation on the preliminary PET image. For example, the detector normalization may be performed to correct variations in detector sensitivities, thereby reducing or eliminating an artifact caused by the variations in the resulting PET image.

In 503, the processing device 120A (e.g., the generation module 402) may generate an attenuation-corrected PET image of the subject based on the PET image and the CT image by application of an attenuation correction model.

As used herein, an attenuation correction model refers to a neural network model that is configured to receive a PET image and a CT image and output an attenuation corrected PET image corresponding to the PET image according to the PET image and the CT image. An attenuation-corrected PET image corresponding to a PET image refers to an image that is generated by performing an attenuation correction on the PET image using the attenuation correction model.

In some embodiments, the processing device 120A (e.g., the acquisition module 401) may obtain the attenuation correction model from one or more components of the imaging system 100 (e.g., the storage device 130, the terminals(s) 140) or an external source via a network (e.g., the network 150). For example, the attenuation correction model may be previously trained by a computing device (e.g., the processing device 120B), and stored in a storage device (e.g., the storage device 130, the storage 220, and/or the storage 390) of the imaging system 100. The processing device 120A may access the storage device and retrieve the attenuation correction model. In some embodiments, the attenuation correction model may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the attenuation correction model may be a supervised learning algorithm, a semi-supervised learning algorithm, an unsupervised learning algorithm, or the like. In some embodiments, the attenuation correction model may be generated by a computing device (e.g., the processing device 120B) by performing a process (e.g., process 700) for generating an attenuation correction model disclosed herein. More descriptions regarding the generation of the attenuation correction model may be found elsewhere in the present disclosure. See, e.g., FIGS. 7-9 and relevant descriptions thereof.

The attenuation correction model may be of any type of neural network model. For example, the attenuation correction model may be a trained cascaded neural network including a plurality of trained models that are sequentially connected. The plurality of trained models may include a trained first model and at least one trained second model downstream to the trained first model. During the application of the attenuation correction model, an input of the trained first model may include the PET image and the CT image, and an input of each of the at least one trained second model may include the PET image, the CT image, and an output image of a previous trained model that is upstream and connected to the trained second model. In some embodiments, a trained model of the trained cascaded neural network may be a trained convolutional neural network (CNN) model, a trained generative adversarial network (GAN) model, or any other suitable type of model. Exemplary CNN models may include a Fully Convolutional Network, such as a V-NET model, a U-NET model, etc. Exemplary GAN models may include a pix2pix model, a Wasserstein GAN (WGAN) model, etc. The trained models of the trained cascaded neural network may be of the same type or different types. For example, each of the trained models may be a CNN model. As another example, one of the trained models may be a CNN model, and the other trained model(s) may be GAN model(s).

In some embodiments, during the application of the attenuation correction model, the processing device 120A may directly input the CT image and the PET image of the subject into the attenuation correction model, and the attenuation correction model may output the attenuation-corrected PET image of the subject. Alternatively, the processing device 120A may need to preprocess the CT image and the PET image of the subject and/or post-process an output of the attenuation correction model to generate the attenuation-corrected PET image. More descriptions regarding the generation of the attenuation-corrected PET image by application of the attenuation correction model may be found elsewhere in the present disclosure. See, FIG. 6 and the descriptions thereof.

In some embodiments, the processing device 120A may transmit the attenuation-corrected PET image of the subject to a terminal (e.g., a terminal 140) for display. Optionally, a user of the terminal may input a response regarding the attenuation-corrected PET image via, for example, an interface of the terminal. For example, the user may evaluate whether the attenuation-corrected PET image satisfies a preset condition (e.g., the quality of the attenuation-corrected PET image is satisfying). According to the evaluation result, the user may send a request to, for example, adjust scanning parameters of the subject, adjust a pose of the subject during scanning, rescan the subject, repeat or redo the attenuation correction, or the like, or any combination thereof, to the processing device 120A. In some embodiments, operations 501 and/or 503 may be performed during or immediately after a PET scan of the subject to achieve an instant browsing of the attenuation-corrected PET image of the subject. For example, by using the attenuation correction model, the generation of the attenuation-corrected PET image may cost a time shorter than a predetermined threshold (e.g., 0.5 seconds, 1 second, 2 seconds, 3 seconds), such that a user may browse the attenuation-corrected PET image in real-time or substantially in real-time.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations of the process 500 may be omitted and/or one or more additional operations may be added. For example, a storing operation may be added elsewhere in the process 500. In the storing operation, the processing device 120A may store information and/or data (e.g., the attenuation-corrected PET image, the attenuation correction model, etc.) associated with the imaging system 100 in a storage device (e.g., the storage device 130) disclosed elsewhere in the present disclosure. In some embodiments, only the PET image of the subject may be acquired in 501, and the attenuation-corrected PET image may be generated based on the PET image by application of the attenuation correction model.

Figure 6:
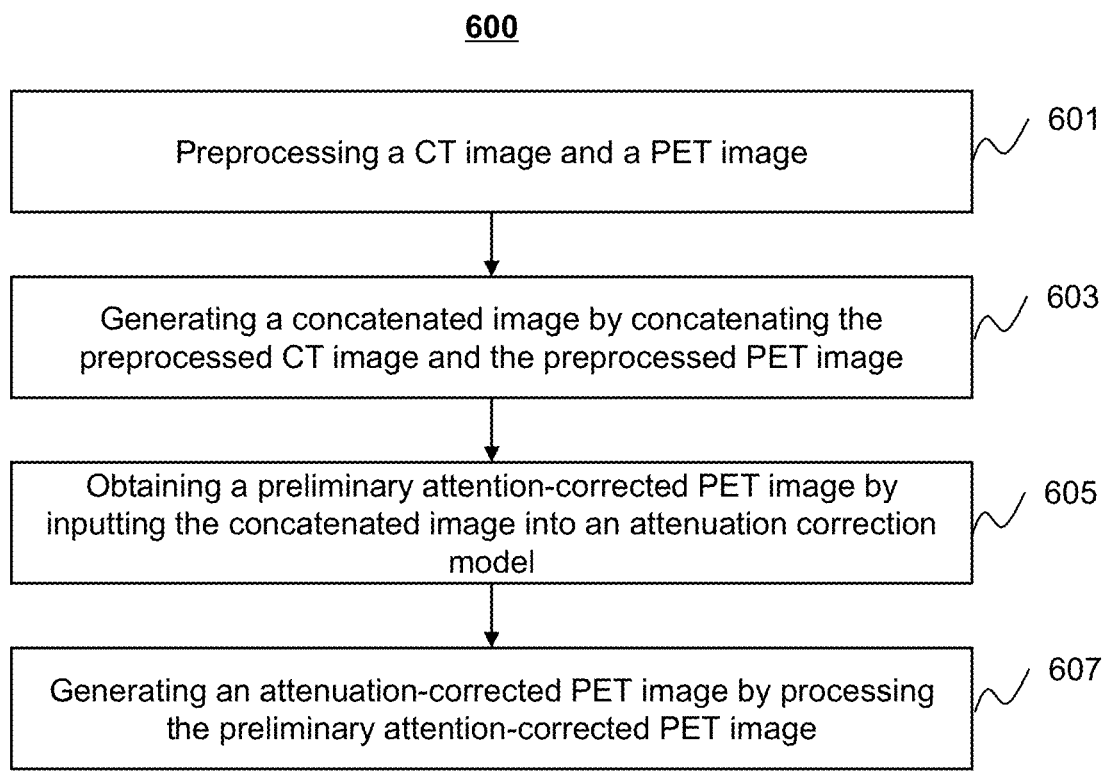
FIG. 6 is a flowchart illustrating an exemplary process for generating an attenuation-corrected PET image according to some embodiments of the present disclosure.

FIG. 6 is a flowchart illustrating an exemplary process 600 for generating an attenuation-corrected PET image according to some embodiments of the present disclosure. In some embodiments, process 600 may be implemented as a set of instructions (e.g., an application) stored in a storage device (e.g., the storage device 130, storage 220, and/or storage 390). The processing device 120A (e.g., the processor 210, the CPU 340, and/or one or more modules illustrated in FIG. 4A) may execute the set of instructions, and when executing the instructions, the processing device 120A may be configured to perform the process 600. The operations of the illustrated process presented below are intended to be illustrative. In some embodiments, one or more operations of the process 600 may be performed to achieve at least part of operation 503 as described in connection with FIG. 5.

In 601, the processing device 120A (e.g., the generation module 402) may preprocess the CT image and the PET image of the subject.

The preprocessing of the CT image and the PET image may include one or more image processing operations, such as an image registration, an image denoising, an image enhancement, an image smoothing, an image transformation, an image resampling, an image normalization, or the like, or a combination thereof. The CT image and the PET image may be subjected to same image processing operation(s) or different image processing operations. In some embodiments, the preprocessing of the CT image and the PET image may include an image registration, an image resampling, and an image normalization, which may be performed simultaneously or in any sequence.

Merely by way of example, the processing device 120A may register the CT image with the PET image. By registration, a registration matrix that represents a transformation relationship between the CT image and the PET image may be generated. According to the registration matrix, a certain pixel (or voxel) of the CT image may be transformed to a same position in the registered CT image as a corresponding pixel (or voxel) of the certain pixel in the registered PET image. As used herein, two pixels (or voxel) in two images are regarded as being corresponding to each other if they represent a same physical point of a same subject. For example, the CT image and the PET image may be registered according to an objective function E, which may be represented according to Equation (1) as below:

$$E=E(M,F(T)), \tag{1}$$

where M and F represent two images to be registered, E represents a degree of registration, and T represents a spatial transformation performed on the image F. According to Equation (1), E may be a function of the spatial transformation T, that is, E=E(T). In some embodiments, the CT image may be registered with the PET image according to a machine learning model (e.g., a neural network model, a deep learning model, etc.).

The processing device 120A may further generate a resampled CT image and a resampled PET image by resampling the registered CT image and the registered PET image. Each of the resampled CT image and the resampled PET image may have a preset image resolution. An image resolution of an image may be measured by, for example, a size and/or count of the pixels or voxels of the image. For example, the voxel size of each of the resampled CT image and the resampled PET image may be [6 mm, 6 mm, 6 mm], [5 mm, 5 mm, 5 mm], or the like. In some embodiments, the preset image resolution may be associated with the attenuation correction model. For example, the attenuation correction model may be configured to perform attenuation correction on a PET image with a certain image resolution. The registered CT image and the registered PET image may be resampled according to the certain image resolution. In some embodiments, the image resampling of the registered CT image and the registered PET image may be performed according to a resampling algorithm, such as a nearest neighbor algorithm, a bilinear interpolation algorithm, a cubic convolution algorithm, etc.

The processing device 120A may then generate the preprocessed CT image and the preprocessed PET image by normalizing the resampled CT image and the resampled PET image. In some embodiments, the normalization of an image may be performed such that pixel (or voxel) values of the image may be within a preset range (e.g., [−1, 1]). In some embodiments, the attention correction model may be trained using a plurality of sample PET images and a plurality of sample CT images corresponding to the sample PET images (which will be described in connection with FIG. 7). Each of the resampled CT image and the resampled PET image may be normalized according to Equation (2) as below:

$$I' = \frac{I-\mu}{\sigma}, \tag{2}$$

where I represents an image to be normalized (e.g., the resampled CT image or the resampled PET image), and I' represents a normalized image of the image I (e.g., the preprocessed CT image or the preprocessed PET image). When I represents the resampled PET image, $\mu$ represents a mean value of the sample PET images (or resampled sample PET images), and $\sigma$ represents a standard deviation of the sample PET images (or resampled sample PET images). When I represents the resampled CT image, $\mu$ represents a mean value of the sample CT images (or resampled sample CT images), and $\sigma$ represents a standard deviation of the sample CT images (or resampled sample CT images). It should be noted that the above description of preprocessing of the PET and CT images is merely provided for the purposes of illustration, and not intended to limit the scope of the present disclosure. For example, the resampling of the PET image (or the CT image) may be omitted if the image resolution of the PET image (or the CT image) is equal to the preset image resolution. As another example, the image normalization of the resampled CT image and/or the resample PET image may be omitted.

In 603, the processing device 120A (e.g., the generation module 402) may generate a concatenated image by concatenating the preprocessed CT image and the preprocessed PET image. In some embodiments, the preprocessed CT image and the preprocessed PET image may be concatenated along a preset dimension (e.g., a channel dimension). For example, the preprocessed CT and PET images may both be 2-dimensional images including a first dimension and a second dimension. The preprocessed CT and PET images may be concatenated along a third dimension to generate the concatenated image (e.g., a 3-dimensional image including the first, second and third dimensions).

In 605, the processing device 120A (e.g., the generation module 402) may obtain a preliminary attention-corrected PET image by inputting the concatenated image into the attenuation correction model. In some embodiments, the attenuation correction model may include a plurality of sequentially connected trained models, which includes a trained first model and one or more trained second model downstream to the trained first model. The first trained model may be configured to receive the concatenated image and output an image. Each trained second model may be configured to receive the concatenated image and an output image of a previous trained model connected to the trained second model, and output an image. The preliminary attention-corrected PET image may be an output image of the last second trained model of the attenuation correction model.

In 607, the processing device 120A (e.g., the generation module 402) may generate the attenuation-corrected PET image by processing the preliminary attention-corrected PET image.

In some embodiments, the processing device 120A may generate the attenuation-corrected PET image by performing a denormalization operation and/or a resampling operation on the preliminary attention-corrected PET image. For example, the preliminary attention-corrected PET image may be denormalized according to Equation (3) as below:

$$f''=f'*\sigma_{gt}+\mu_{gt}, \tag{3}$$

where f' represents an image to be denormalized (e.g., the preliminary attention-corrected PET image), f'' represents a denormalized image (e.g., a denormalized preliminary attenuation-corrected PET image), $\sigma_{gt}$ represents a standard deviation of a plurality of sample attenuation-corrected PET images used in training the attenuation correction model, and $\mu_{gt}$ represents a mean value of the sample attenuation-corrected PET images. The processing device 120A may further generate the attenuation-corrected PET image by resampling the denormalized preliminary attenuation-corrected PET image. The attenuation-corrected PET image may have a same image resolution as the original PET image.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The operations of the illustrated process presented below are intended to be illustrative. In some embodiments, the process 600 may be accomplished with one or more additional operations not described and/or without one or more of the operations discussed. For example, operation 601 may be omitted, and the concatenated image may be generated by concatenating the original CT image and the original PET image. As another example, in 605, an output image of the attenuation correction model may be designated as the attenuation-corrected PET image without being processed. Additionally, the order of the operations of process 600 illustrated in FIG. 6 and described below is not intended to be limiting. As yet another example, operations 605 and 607 may be integrated into a single operation.

FIG. 7 is a flowchart illustrating an exemplary process 700 for generating an attenuation correction model according to some embodiments of the present disclosure. In some embodiments, process 700 may be implemented as a set of instructions (e.g., an application) stored in a storage device (e.g., the storage device 130, storage 220, and/or storage 390). The processing device 120B (e.g., the processor 210, the CPU 340, and/or one or more modules illustrated in FIG. 4B) may execute the set of instructions, and when executing the instructions, the processing device 120B may be configured to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting. In some embodiments, the attenuation correction model described in connection with operation 503 in FIG. 5 may be obtained according to the process 700. In some embodiments, the process 700 may be performed by another device or system other than the imaging system 100, e.g., a device or system of a vendor of a manufacturer. For illustration purposes, the implementation of the process 700 by the processing device 120B is described as an example.

In 701, the processing device 120B (e.g., the acquisition module 403) may acquire a plurality of training samples. Each of the plurality of training samples may include a sample PET image of a sample subject, a sample CT image of the sample subject, and a sample attenuation-corrected PET image corresponding to the sample PET image.

As used herein, a sample subject refers to an object that is used for training the attenuation correction model. The sample subject may be of the same type or a different type of object as the subject as described in connection with FIG. 5. For example, if the attenuation correction model is used to perform attenuation correction on a PET image of a patient (or a portion thereof), the sample subject may be another patient. A sample PET image and a sample CT image of a sample subject refer to a PET image and a CT image of the sample subject. A sample attenuation-corrected PET image corresponding to a sample PET image refers to a ground truth PET image that is generated by performing an attenuation correction on the sample PET image (or sample PET image data corresponding to the sample PET image) using an attenuation correction technique other than the attenuation correction model disclosed herein. For example, the sample attenuation-corrected PET image may be generated by a CT-based attenuation correction technique (e.g., a scaling algorithm, a segmentation algorithm, a Hybrid algorithm, etc.).

In some embodiments, a training sample may be previously generated and stored in a storage device (e.g., the storage device 130, the storage 220, the storage 390, or an external database). The processing device 120B may retrieve the training sample directly from the storage device. In some embodiments, at least a portion of a training sample may be generated by the processing device 120B. Merely by way of example, a PET scan and a CT scan may be performed on a sample subject to acquire sample PET image data and sample CT image data of the sample subject. The processing device 120B may acquire the sample PET image data and the sample CT image data of the sample subject from a storage device that stores the sample PET image data and the sample CT image data. The processing device 120B may reconstruct a sample CT image of the sample subject based on the sample CT image data, and a sample PET image of the sample subject based on the sample PET image data. The reconstruction of the sample CT and PET images of the sample subject may be performed in a similar manner with that of the CT and PET images of the subject as described in connection with 501, and the descriptions thereof are not repeated here. Additionally or alternatively, the processing device 120B may reconstruct a sample attenuation-corrected PET image of the sample subject based on the sample CT image and the sample PET image. During the reconstruction of the sample attenuation-corrected PET image, an attenuation correction may be performed on the sample PET image (or the sample PET image data) according to the sample CT image. In some embodiments, the sample attenuation-corrected PET image may be reconstructed according to a reconstruction algorithm, such as a Filter Back Projection (FPB) algorithm, a Maximum Likelihood (MLEM) algorithm, a Least Square (LS) algorithm, a Maximum A Posterior (MAP) algorithm, an Ordered Subsets Expectation Maximization (OSEM) algorithm, etc.

In 703, the processing device 120B (e.g., the training module 404) may generate the attenuation correction model by training a cascaded neural network using the plurality of training samples.

Figure 10:
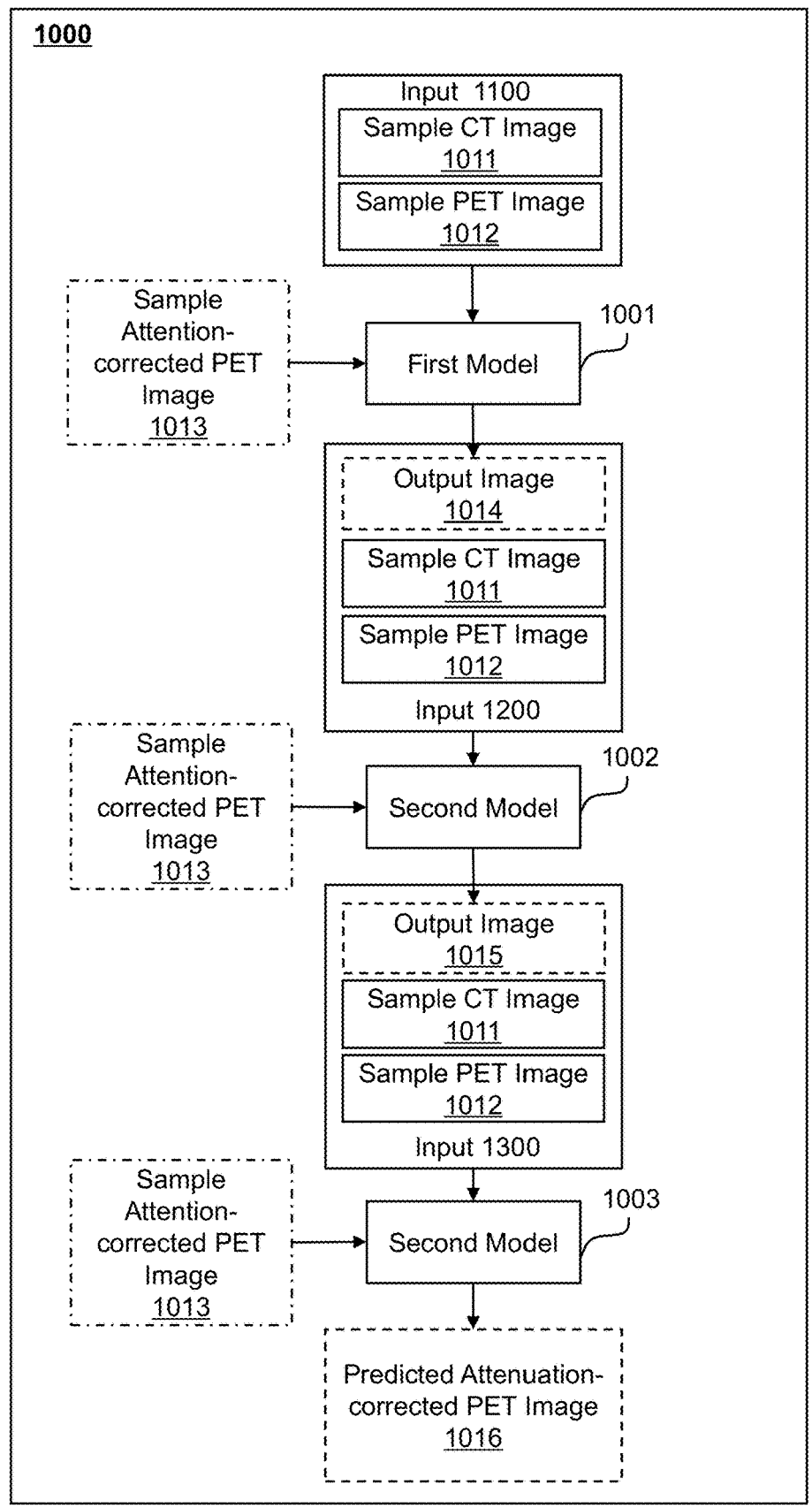
FIG. 10 illustrates an exemplary cascaded neural network according to some embodiments of the present disclosure.

The cascaded neural network may include a plurality of sequentially connected models. The plurality of models may include a first model and at least one second model downstream to the first model. For example, the cascaded neural network may include N models (e.g., a model M1, a model M2, . . . , and a model Mn), wherein the model M1 may be connected to the model M2, the model M2 may be connected to the model M3, . . . , and the model $M_{n-1}$ may be connected to the model Mn. For illustration purposes, FIG. 10 illustrates an exemplary cascaded neural network 1000 according to some embodiments of the present disclosure. As shown in FIG. 10, the cascaded neural network 1000 may include three sequentially connected models, i.e., a first model 1001, a second model 1002, and a second model 1003.

In some embodiments, a model of the cascaded neural network may be a convolutional neural network (CNN) model, a generative adversarial network (GAN) model, or any other suitable type of model. Exemplary CNN models may include a Fully Convolutional Network, such as a V-NET model, a U-net model, etc. Exemplary GAN models may include a pix2pix model, a Wasserstein GAN (WGAN) model, etc. A GAN model may include a generator and a discriminator. The generator and the discriminator may compete with each other to reach a balance point at which the generator is trained to generate an image similar to (or almost the same as) a ground truth image (e.g., a sample attenuation-corrected PET image).

The plurality of models of the cascaded neural network may be of the same type or different types. For example, each model of the attenuation correction model may be a GAN model, in order to improve the correction accuracy and generate an attenuation-corrected PET image with a high image quality. In some embodiments, one or more of the models of the cascaded neural network may be a CNN model. The depth of each CNN model may be smaller than a threshold in order to reduce the number (count) of generated feature maps on the premise of model accuracy. This may reduce the required processing time of the resulting attenuation correction model in application and achieve a rapid PET image reconstruction. In some embodiments, the cascaded neural network may include one or more additional components, such as a skip-connection, a residual block, a dense block, or the like, or any combination thereof. Such additional components may be configured to combine different features extracted by different layers (or components) of the cascaded neural network, thereby accelerating convergence during model training and improving the accuracy of the resulting attenuation correction model.

In some embodiments, the cascaded neural network may include one or more model parameters. The processing device 120B may initialize parameter value(s) of the model parameter(s) before training, and the value(s) of the model parameter(s) of the cascaded neural network may be updated during the training of the cascaded neural network. Exemplary model parameters of the cascaded neural network may include the number (count) of the models in the cascaded neural network, model parameters of each of the models, a loss function, or the like, or any combination thereof. Taking a CNN model of the cascaded neural network as an example, exemplary model parameters of the CNN model may include the number (or count) of convolutional layers, the number (or count) of kernels, a kernel size, a stride, a padding of each convolutional layer, or the like, or any combination thereof. In some embodiments, the kernel size, the stride, and the padding of a convolutional layer of the CNN model may be equal to 3, 1, and 1, respectively.

In some embodiments, the cascaded neural network may be trained using a deep auto-context learning strategy. By using the deep auto-context learning strategy, a difference between an output image of each model and the ground truth attenuation-corrected PET image may be reduced gradually, thereby generating an attenuation correction model with a high reliability. In addition, the training samples (e.g., the sample PET images and the sample CT images) may be inputted into each of the models during the training process. This may avoid a loss of image data due to operations (e.g., a convolutional operation) performed in training.

For example, the models of the cascaded neural network may be trained in parallel during the training of the cascaded neural network. Merely by way of example, the processing device 120B may train the cascaded neural network by iteratively and jointly updating the parameters of each model of the cascaded neural network based on the training samples. In some embodiments, the training of the cascaded neural network may include one or more iterations, wherein at least one of the iteration(s) may include one or more operations of process 800 as described in connection with FIG. 8.

Alternatively, the models of the cascaded neural network may be sequentially trained during the training of the cascaded neural network. In some embodiments, the first model may be trained using the plurality of training samples. Each of the at least one second model may be trained using the plurality of training samples and one or more trained models generated before the training of the second model. For example, a model $M_i$ (i being greater than 1) of the cascaded neural network may be trained based on the training samples and the trained models M1 to $M_{i-1}$ that are generated before the training of the model $M_i$. More descriptions regarding the training of a second model may be found elsewhere in the present disclosure. See, e.g., FIG. 9 and relevant descriptions thereof.

In some embodiments, the training samples (or a portion thereof) may need to be preprocessed before being used in training the cascaded neural network. For example, for a training sample, the processing device 120B may generate a sample concentrated image by performing image registration, image resampling, image normalization, and image concatenation on the corresponding sample PET image and the sample CT image. The generation of a sample concatenated image may be performed in a similar manner with that of a concatenated image as described in operation 603, and the descriptions thereof are not repeated here. The processing device 120B may also perform image resampling and/or image normalization on the sample attenuation-corrected PET image of the training sample to generate a preprocessed sample attenuation-corrected PET image. The processing device 120B may further generate the attenuation correction model by training the cascaded neural network using the sample concatenated image and the preprocessed sample attenuation-corrected PET image of each training sample.

In some embodiments, the training samples (or a portion thereof) may be previously preprocessed and stored in a storage device (e.g., the storage device 130, the storage 220, the storage 390, or an external database). For example, the sample CT image, the sample PET image, and/or the sample attenuation-corrected PET image of a training sample may be images that have been preprocessed and stored in the storage device. The processing device 120B may retrieve the training sample from the storage device, and apply the training sample in training the cascaded neural network without preprocessing the training sample. In some embodiments, the sample CT image and the sample PET image of a training sample may be stored in the storage device as a corresponding sample concatenated image.

It should be noted that the above description regarding process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted. For example, the attenuation correction model may be stored in a storage device (e.g., the storage device 130) disclosed elsewhere in the present disclosure for further use (e.g., in attenuation correction of a PET image as described in connection with FIG. 5). As another example, after the attenuation correction model is generated, the processing device 120B may further test the attenuation correction model using a set of testing images. Additionally or alternatively, the processing device 120B may update the attenuation correction model periodically or irregularly based on one or more newly-generated training images (e.g., new sample PET images, new sample CT images, and new sample attenuation-corrected PET images generated in medical diagnosis).

Figure 8:
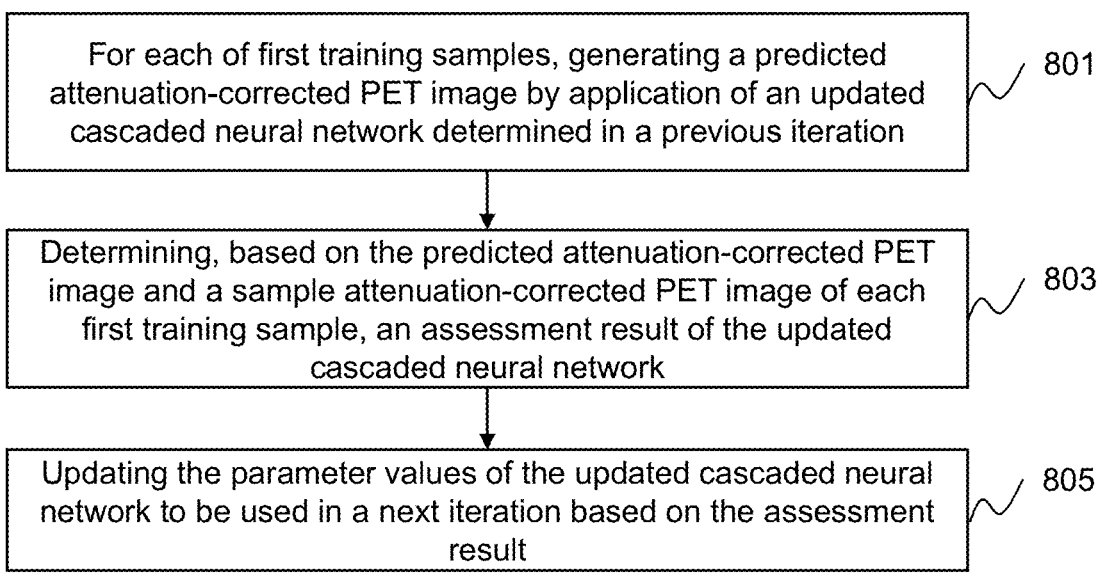
FIG. 8 is a flowchart illustrating an exemplary process for training a cascaded neural network according to some embodiments of the present disclosure.

FIG. 8 is a flowchart illustrating an exemplary process 800 for training a cascaded neural network according to some embodiments of the present disclosure. In some embodiments, process 800 may be implemented as a set of instructions (e.g., an application) stored in a storage device (e.g., the storage device 130, storage 220, and/or storage 390). The processing device 120B (e.g., the processor 210, the CPU 340, and/or one or more modules illustrated in FIG. 4B) may execute the set of instructions, and when executing the instructions, the processing device 120B may be configured to perform process 800. In some embodiments, one or more operations of process 800 may be performed to achieve at least part of operation 703 as described in connection with FIG. 7. For example, the process 800 may be performed to achieve a current iteration in training the cascaded neural network, during which the models of the cascaded neural network are trained in parallel. The current iteration may be performed based on at least some of the training samples (or referred to as first training samples). In some embodiments, a same set or different sets of first training samples may be used in different iterations in training the cascaded neural network.

In 801, for each of the first training samples, the processing device 120B (e.g., the training module 404) may generate a predicted attenuation-corrected PET image by application of an updated cascaded neural network determined in a previous iteration.

During the application of the updated cascaded neural network on a first training sample, the first model of the updated cascaded neural network may be configured to receive the first training sample, and each second model of the updated cascaded neural network may be configured to receive the first training sample and an output image of a previous model that is upstream and connected to the second model in the updated cascaded neural network. The predicted attenuation-corrected PET image may be an output image of the last second model of the sequentially connected models in the updated cascaded neural network. As used herein, "receiving a training sample" refers to receiving the (preprocessed) sample CT image and the (preprocessed) sample PET image of the training sample. In some embodiments, an input of a model may include a plurality of images. The images may be directly inputted into the model, or be concatenated into a concatenated image and inputted into the model. For example, the input of the first model may include a sample concatenated image generated based on the sample CT image and the sample PET image of the first training sample. The input of a second model may include a concatenated image generated based on the sample concatenated image and the output image of the previous model connected to the second model.

For example, an updated cascaded neural network (denoted as A) of the cascaded neural network 1000 as illustrated in FIG. 10 may be determined in the previous iteration. A first training sample may include a sample CT image 1011, a sample PET image 1012, and a sample attention-corrected PET image 1013. The sample CT image 1011 and the sample PET image 1012 may be preprocessed and concatenated to generate a sample concatenated image, i.e., an input 1100. The input 1100 may be inputted to the first model 1001 of the updated cascaded neural network A to generate an output image 1014. The output image 1014 and the input 1100 may be concatenated to generate an input 1200. The input 1200 may be inputted to the second model 1002 of the updated cascaded neural network A to generate an output image 1015. The output image 1015 and the input 1100 may be concatenated to generate an input 1300. The input 1300 may be inputted to the second model 1003 to generate an output image, i.e., the predicted-attenuation-corrected PET image 1016.

In 803, the processing device 120B (e.g., the training module 404) may determine, based on the predicted attenuation-corrected PET image and the sample attenuation-corrected PET image of each first training sample, an assessment result of the updated cascaded neural network.

The assessment result may indicate an accuracy and/or efficiency of the updated cascaded neural network. Taking the updated cascaded neural network A aforementioned as an example, the assessment result may be associated with a difference between the predicted attenuation-corrected PET image 1016 and the sample attenuation-corrected PET image 1013 of each first training sample. For example, a value of an overall loss function, such as an L1 loss, an L2 loss, or a smooth L1 loss, may be determined to measure an overall difference between the predicted attenuation-corrected PET image 1016 and the sample attenuation-corrected PET image 1013 of each first training sample. The processing device 120B may determine the assessment result based on the value of the overall loss function. As another example, for each model in the updated cascaded neural network, the processing device 120B may determine a value of a loss function corresponding to the model based on the sample attenuation-corrected PET image 1013 and an output image of the model corresponding to each first training sample. Merely by way of example, as represented by dotted boxes in FIG. 10, the sample attenuation-corrected PET image 1013 and the output image 1014 may be used to determine a value of the loss function corresponding to the first model 1001. The sample attenuation-corrected PET image 1013 and the output image 1015 may be used to determine a value of the loss function corresponding to the second model 1002. The processing device 120B may determine the assessment result based on the values of the loss functions of the models in the updated cascaded neural network A. Additionally or alternatively, the assessment result may be associated with a time needed for the updated cascaded neural network A to generate the predicted attenuation-corrected PET image 1016 of each first training sample. For example, the short the needed time is, the high efficiency the updated cascaded neural network A has.

In some embodiments, the assessment result may include a determination as to whether a termination condition is satisfied in the current iteration. In some embodiments, the termination condition may relate to the value of the overall loss function and/or the value of the loss function of each model in the updated cascaded neural network. For example, the termination condition may be satisfied if the value of the overall loss function is minimal or smaller than a threshold (e.g., a constant). As another example, the termination condition may be satisfied if the value of the overall loss function converges. In some embodiments, convergence may be deemed to have occurred if, for example, the variation of the values of the overall loss function in two or more consecutive iterations is equal to or smaller than a threshold (e.g., a constant), a certain count of iterations may be performed, or the like. In some embodiments, the termination condition may be satisfied if a time needed for the updated cascaded neural network to generate the predicted attenuation-corrected PET image of each first training sample is smaller than a threshold.

In some embodiments, in response to a determination that the termination condition is satisfied, the processing device 120B may determine the updated cascaded neural network as the attenuation correction model. In response to a determination that the termination condition is not satisfied, the processing device 120B may proceed to 805, in which the processing device 120B (e.g., the training module 404) may update the parameter values of the updated cascaded neural network to be used in a next iteration based on the assessment result.

For example, the processing device 120B may update the parameter value(s) of each model in the updated cascaded neural network based on the value of the overall loss function according to, for example, a backpropagation algorithm. As another example, for each of the models in the updated cascaded neural network, the processing device 120B may update the parameter value(s) of the model based on the value of the corresponding loss function and optionally the value(s) the loss function(s) of the model(s) downstream to the model. In some embodiments, a model may include a plurality of parameter values, and updating parameter value(s) of the model refers to updating at least a portion of the parameter values of the model.

Figure 9:
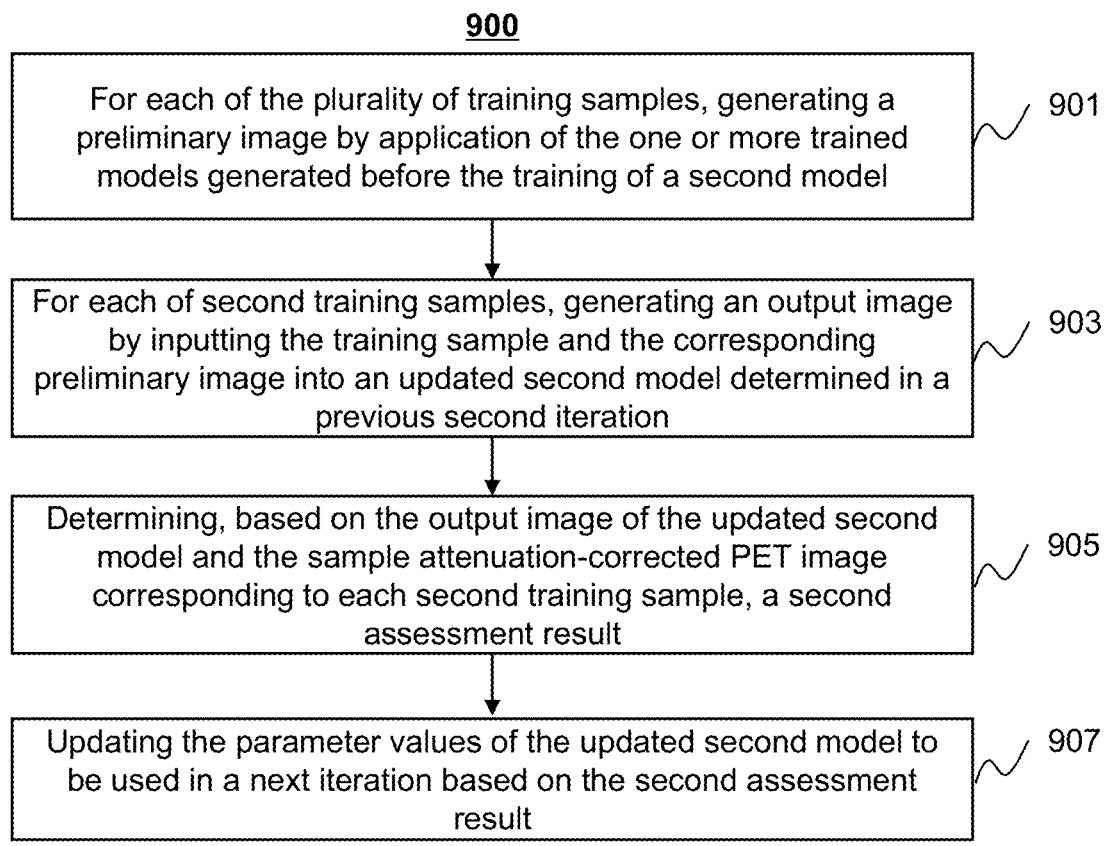
FIG. 9 is a flowchart illustrating an exemplary process for training a second model of a cascaded neural network according to some embodiments of the present disclosure.

FIG. 9 is a flowchart illustrating an exemplary process 900 for training a second model of a cascaded neural network according to some embodiments of the present disclosure. In some embodiments, process 900 may be implemented as a set of instructions (e.g., an application) stored in a storage device (e.g., the storage device 130, storage 220, and/or storage 390). The processing device 120B (e.g., the processor 210, the CPU 340, and/or one or more modules illustrated in FIG. 4B) may execute the set of instructions, and when executing the instructions, the processing device 120B may be configured to perform the process 900. In some embodiments, one or more operations of the process 900 may be performed to achieve at least part of operation 703 as described in connection with FIG. 7. For example, the cascaded neural network may include a plurality of sequentially connected models including a first model and at least one second model downstream to the first model. The plurality of models may be trained in sequence. The process 900 may be performed for training a second model of the cascaded neural network.

In 901, for each of the plurality of training samples, the processing device 120B (e.g., the training module 404) may generate a preliminary image by application of the one or more trained models generated before the training of the second model. The preliminary image may be an output image of a last model of the one or more trained models that is upstream and connected to the updated second model.

For example, if the second model to be trained is a model Mi of the cascaded neural network, the processing device 120B may generate a preliminary image corresponding to a training sample by application of the trained model M1 to $M_{i-1}$. Merely by way of example, a sample PET image and a sample CT image of the training sample may be inputted into a model including the trained models M1 to $M_{i-1}$ to generate a preliminary attenuation-corrected sample PET image (referred to as a preliminary image for brevity).

The processing device 120 may further train the second model using the training samples and the corresponding preliminary images. For example, the processing device 120B may initialize parameter values of the second model before training the second model or before training the cascaded neural network. The processing device 120B may train the second model by iteratively updating the parameter values of the second model based on the training samples and corresponding preliminary images. In some embodiments, the training of the second model may include one or more second iterations. For illustration purposes, a current second iteration including operations 903-907 of the process 900 is described hereinafter. The current second iteration may be performed based on at least some of the training samples (or referred to as second training samples). The second training samples may include one or more same training samples as or different training samples from the first training samples as described in connection with FIG. 8. In some embodiments, a same set or different sets of second training samples may be used in different second iterations in training the second model.

In 903, for each of the second training samples, the processing device 120B (e.g., the training module 404) may generate an output image by inputting the training sample and the corresponding preliminary image into the updated second model.

For example, for a second training sample, the sample CT image, the sample PET image, and the corresponding preliminary image of the second training sample may be concatenated to generate a concatenated image, which may be inputted to the updated second model.

In 905, the processing device 120B (e.g., the training module 404) may determine, based on the output image of the updated second model and the sample attenuation-corrected PET image corresponding to each second training sample, a second assessment result.

The second assessment result may indicate an accuracy and/or efficiency of the updated second model. In some embodiments, the second assessment result may be associated with a difference between the output image of the updated second model and the sample attenuation-corrected PET image corresponding to each second training sample. For example, the processing device 120B may determine a value of a second loss function (e.g., a L1 loss, a L2 loss, or a smooth L1 loss) corresponding to the updated second model based on the output image of the updated second model and the sample attenuation-corrected PET image corresponding to each second training samples. Additionally or alternatively, the second assessment result may be associated with a second time needed for the updated second network to generate the output image of each of the at least some of the plurality of training samples. For example, the shorter the second needed time is, the higher efficiency the updated second model has.

In some embodiments, the processing device 120B may determine the second assessment result based on the value of the second loss function and/or the second needed time. The second assessment result may include a determination as to whether a second termination condition is satisfied in the current second iteration. The determination of the second assessment result may be performed in a similar manner with that of the first assessment result as described in connection with FIG. 8, and the descriptions thereof are not repeated here.

In some embodiments, in response to a determination that the second termination condition is satisfied, the processing device 120B may determine the updated second model as the trained second model. In response to a determination that the second termination condition is not satisfied, the processing device 120B may proceed to 907, in which the processing device 120B (e.g., the training module 404) may update the parameter values of the updated second model to be used in a next iteration based on the second assessment. For example, the processing device 120B may update the parameter value(s) of the updated second model based on the value of the second loss function according to, for example, a backpropagation algorithm.

It should be noted that the above descriptions regarding the processes 800 and 900 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The operations of the illustrated process presented above are intended to be illustrative. In some embodiments, the process 800 and/or process 900 may be accomplished with one or more additional operations not described and/or without one or more of the operations discussed. Additionally, the order of the operations of the process 800 and/or the process 900 is not intended to be limiting. For example, in process 900, the processing device 120B may further test the trained second model using a set of testing samples to determine whether a testing condition is satisfied. If the testing condition is not satisfied, the process 900 may be performed again to further train the model.

Figure 11A:
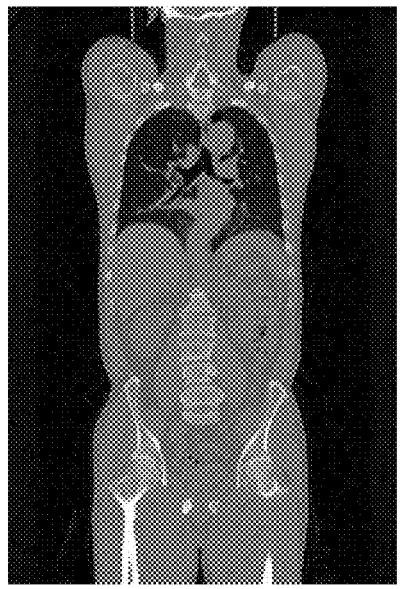
FIG. 11A illustrates an exemplary CT image of a portion of a patient according to some embodiments of the present disclosure.
Figure 11B:
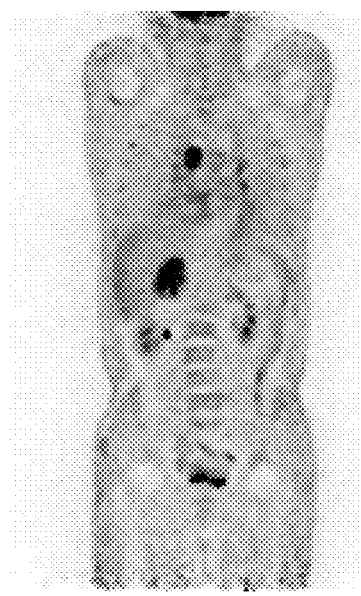
FIG. 11B illustrates an exemplary PET image of the portion of the patient in FIG. 11A according to some embodiments of the present disclosure.
Figure 11C:
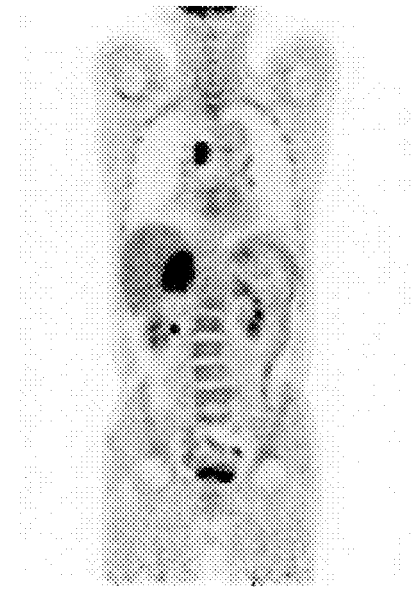
FIG. 11C illustrates an exemplary attenuation-corrected PET image corresponding to the PET image in FIG. 11B according to some embodiments of the present disclosure.

FIG. 11A illustrates an exemplary CT image 1101 of a portion of a patient according to some embodiments of the present disclosure. FIG. 11B illustrates an exemplary PET image 1102 of the portion of the patient in FIG. 11A according to some embodiments of the present disclosure. FIG. 11C illustrates an exemplary attenuation-corrected PET image 1103 corresponding to the PET image 1102 according to some embodiments of the present disclosure. The attenuation-corrected PET image 1103 was generated by application an attenuation correction model disclosed in the present disclosure on the CT image 1101 and the PET image 1102. For example, the CT image 1101 and the PET image 1102 may be inputted to the attenuation correction model. The attenuation correction model may output the attenuation-corrected PET image 1103.

Figure 12A:
FIG. 12A illustrates an exemplary CT image of a portion of a patient according to some embodiments of the present disclosure.
Figure 12B:
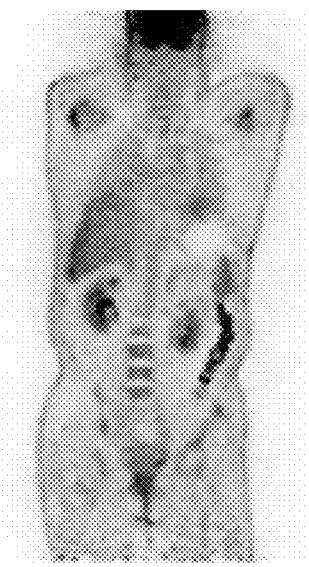
FIG. 12B illustrates an exemplary PET image of the portion of the patient in FIG. 12A according to some embodiments of the present disclosure.
Figure 12C:
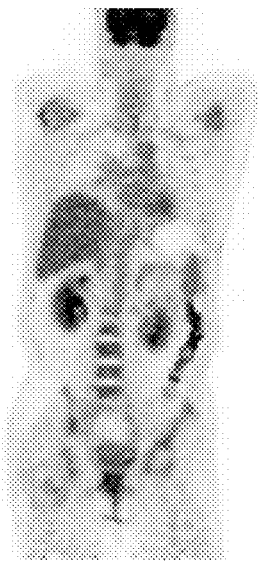
FIG. 12C illustrates an exemplary attenuation-corrected PET image corresponding to the PET image in FIG. 12B according to some embodiments of the present disclosure.

FIG. 12A illustrates an exemplary CT image 1201 of a portion of a patient according to some embodiments of the present disclosure. FIG. 12B illustrates an exemplary PET image 1202 of the portion of the patient in FIG. 12A according to some embodiments of the present disclosure, respectively. FIG. 12C illustrates an exemplary attenuation-corrected PET image 1203 corresponding to the PET image 1202 according to some embodiments of the present disclosure. The attenuation-corrected PET image 1203 was generated by application an attenuation correction model disclosed in the present disclosure on the CT image 1201 and the PET image 1202. For example, the CT image 1201 and the PET image 1202 may be inputted to the attenuation correction model. The attenuation correction model may output the attenuation-corrected PET image 1203.

Figure 13A:
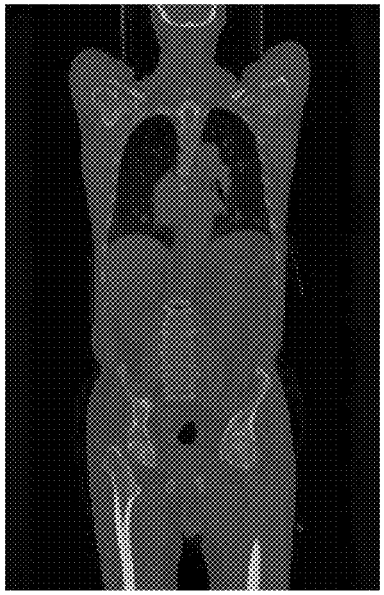
FIG. 13A illustrates an exemplary CT image of a portion of a patient according to some embodiments of the present disclosure.
Figure 13B:
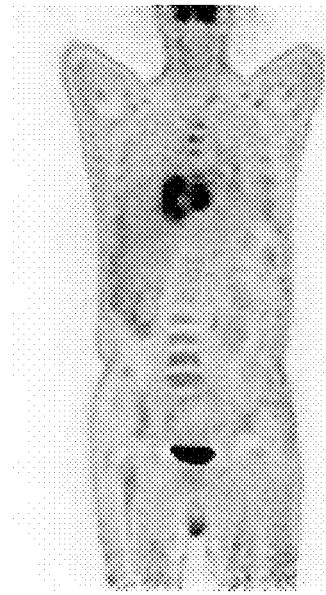
FIG. 13B illustrates an exemplary PET image of the portion of the patient in FIG. 13A according to some embodiments of the present disclosure.
Figure 13C:
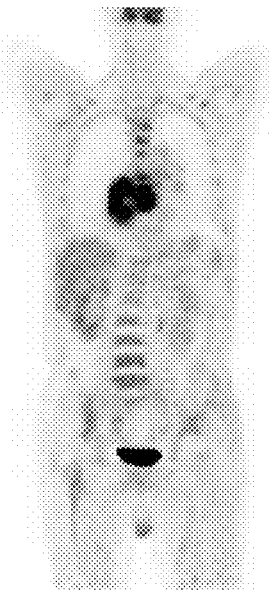
FIG. 13C illustrates an exemplary attenuation-corrected PET image corresponding to the PET image in FIG. 13B according to some embodiments of the present disclosure.

FIG. 13A illustrates an exemplary CT image 1301 of a portion of a patient according to some embodiments of the present disclosure. FIG. 13B illustrates an exemplary PET image 1302 of the portion of the patient in FIG. 13A according to some embodiments of the present disclosure. FIG. 13C illustrates an exemplary attenuation-corrected PET image 1303 corresponding to the PET image 1302 according to some embodiments of the present disclosure. The attenuation-corrected PET image 1303 was generated by application an attenuation correction model disclosed in the present disclosure on the CT image 1301 and the PET image 1302. For example, the CT image 1301 and the PET image 1302 may be inputted to the attenuation correction model. The attenuation correction model may output the attenuation-corrected PET image 1303.

As shown in FIGS. 11A-13C, the attenuation-corrected model may be used to correct a PET image to reconstruct an attenuation-corrected PET image with a relatively higher speed and resolution.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for image correction in positron emission tomography (PET), comprising:
   at least one storage device including a set of instructions; and
   at least one processor configured to communicate with the at least one storage device, wherein when executing the set of instructions, the at least one processor is configured to direct the system to perform operations including:
   acquiring a PET image and a computed tomography (CT) image of a subject;
   generating a concatenated image based on the PET image and the CT image; and
   generating, based on the concatenated image, an attenuation-corrected PET image of the PET image by application of an attenuation correction model, wherein:
   the attenuation correction model is a trained cascaded neural network including a plurality of trained models that are sequentially connected,
   the plurality of trained models include a trained first model and at least one trained second model downstream to the trained first model, and
   during the application of the attenuation correction model, an input of each of the at least one trained second model includes the concatenated image and an output image of a previous trained model that is upstream and connected to the trained second model.

2. The system of claim 1, wherein the generating a concatenated image based on the PET image and the CT image includes:
   preprocessing the CT image and the PET image; and
   generating the concatenated image by concatenating the preprocessed CT image and the preprocessed PET image.

3. The system of claim 2, wherein the preprocessing the CT image and the PET image includes:
   registering the CT image with the PET image;
   generating a resampled CT image and a resampled PET image by resampling the registered CT image and the registered PET image, each of the resampled CT image and the resampled PET image having a preset image resolution; and
   generating the preprocessed CT image and the preprocessed PET image by normalizing the resampled CT image and the resampled PET image.

4. The system of claim 3, wherein the generating, based on the concatenated image, an attenuation-corrected PET image of the PET image by application of an attenuation correction model includes:
   obtaining a preliminary attenuation-corrected PET image by inputting the concatenated image into the attenuation correction model;
   denormalizing the preliminary attenuation-corrected PET image; and
   generating the attenuation-corrected PET image by resampling the denormalized preliminary attenuation-corrected PET image, the attenuation-corrected PET image and the PET image having a same image resolution.

5. The system of claim 4, wherein:
the attenuation correction model is trained using a plurality of sample attenuation-corrected PET images, and
the denormalization of the preliminary attenuation-corrected PET image is performed based on a mean value and a standard deviation of the plurality of sample attenuation-corrected PET images.

6. The system of claim 1, wherein the acquiring a PET image and a CT image of a subject includes:
acquiring CT image data and PET image data of the subject by performing a CT scan and a PET scan of the subject;
reconstructing, based on the CT image data, the CT image;
reconstructing, based on the PET image data, a preliminary PET image; and
generating the PET image by performing a random correction and a detector normalization on the preliminary PET image.

7. The system of claim 1, wherein at least one of the plurality of trained models is a convolutional neural network (CNN) model or a generative adversarial network (GAN) model.

8. The system of claim 1, wherein the generation of the attenuation-corrected PET image of the PET image is performed within 1 second.

9. A system for generating an attenuation correction model, comprising:
at least one storage device including a set of instructions; and
at least one processor configured to communicate with the at least one storage device, wherein when executing the set of instructions, the at least one processor is configured to direct the system to perform operations including:
acquiring a plurality of training samples, each of the plurality of training samples including a sample positron-emission tomography (PET) image of a sample subject, a sample computed tomography (CT) image of the sample subject, and a sample attenuation-corrected PET image corresponding to the sample PET image;
for each of the plurality of training samples, generating a sample concatenated image based on the sample PET image and the sample CT image of the training sample; and
generating the attenuation correction model by training a cascaded neural network using the plurality of training samples and a plurality of sample concatenated images corresponding to the plurality of training samples, wherein:
the cascaded neural network includes a plurality of sequentially connected models,
the plurality of models includes a first model and at least one second model downstream to the first model, and
during the training of the cascaded neural network, each of the at least one second model is trained based on the plurality training samples and one or more models in the cascaded neural network upstream to the second model.

10. The system of claim 9, wherein the plurality of models are trained in parallel during the training of the cascaded neural network, and the training the cascaded neural network includes:
initializing parameter values of the cascaded neural network; and
training the cascaded neural network by iteratively updating the parameter values of the cascaded neural network based on the plurality of training samples.

11. The system of claim 10, wherein iteratively updating the parameter values of the cascaded neural network includes performing an iterative operation including one or more iterations, and each of at least one iteration of the iterative operation includes:
for each of at least some of the plurality of training samples, generating a predicted attenuation-corrected PET image by application of an updated cascaded neural network determined in a previous iteration;
determining, based on the predicted attenuation-corrected PET image and the sample attenuation-corrected PET image of each of the at least some of the plurality of training samples, an assessment result of the updated cascaded neural network; and
further updating the parameter values of the updated cascaded neural network to be used in a next iteration based on the assessment result, wherein during the application of the updated cascaded neural network to a training sample,
each second model of the updated cascaded neural network is configured to receive the training sample and an output image of a previous model that is upstream and connected to the second model in the updated cascaded neural network, and
the predicted attenuation-corrected PET image is an output image of a last second model of the sequentially connected models in the updated cascaded neural network.

12. The system of claim 11, wherein the determining an assessment result of the updated cascaded neural network comprises:
for each of the plurality of models in the updated cascaded neural network, determining, based on the sample attenuation-corrected PET image and an output image of the model corresponding to each of the at least some of the plurality of training samples, a value of a loss function corresponding to the model; and
determining, based on the values of the loss functions of the plurality of models, the assessment result.

13. The system of claim 12, wherein the parameter values of the cascaded neural network include parameter values of each of the plurality of models, and the further updating the parameter values of the updated cascaded neural network based on the assessment result comprises:
for each of the plurality of models in the updated cascaded neural network, updating the parameter values of the model based on the value of the corresponding loss function.

14. The system of claim 10, wherein the assessment result is determined based on at least one of:
a difference between the predicted attenuation-corrected PET image and the sample attenuation-corrected PET image of each of at least some of the plurality of training samples, or
a time needed for the updated cascaded neural network to generate the predicted attenuation-corrected PET image of each of the at least some of the plurality of training samples.

15. The system of claim 9, wherein:
the training the cascaded neural network comprises sequentially training the plurality of models, the first model is trained using the plurality of training samples, and each of the at least one second model is trained using the plurality of training samples and one or more trained models generated before the training of the second model.

16. The system of claim 15, wherein for each of the at least one second model, the training the second model includes:

for each of the plurality of training samples, generating a preliminary image by application of the one or more trained models generated before the training of the second model;

initializing parameter values of the second model; and training the second model by iteratively updating the parameter values of the second model based on the plurality of training samples and the corresponding preliminary images.

17. The system of claim 16, wherein the training the second model includes a second iterative operation including one or more iterations, each of at least one iteration of the second iterative operation including:

for each of at least some of the plurality of training samples, generating an output image of the second model by inputting the training sample and the corresponding preliminary image into an updated second model determined in a previous iteration;

determining, based on the output image of the updated second model and the sample attenuation-corrected PET image corresponding to each of the at least some of the plurality of training samples, a second assessment result; and further updating the parameter values of the updated second model to be used in a next iteration based on the second assessment result.

18. The system of claim 9, wherein for each of the plurality of training samples, the generating a sample concatenated image based on the sample PET image and the sample CT image of the training sample includes:

preprocessing the sample PET image and the sample CT image; and generating the sample concatenated image by concatenating the preprocessed sample CT image and the preprocessed sample PET image of the training sample.

19. The system of claim 9, wherein at least one of the plurality of models is a convolutional neural network (CNN) model or a generative adversarial network (GAN) model.

20. A method for image correction in positron emission tomography (PET) implemented on a computing device having at least one processor and at least one storage device, the method comprising:

acquiring a PET image and a computed tomography (CT) image of a subject;

generating a concatenated image based on the PET image and the CT image;

generating, based on the concatenated image, an attenuation-corrected PET image of the PET image by application of an attenuation correction model, wherein:

the attenuation correction model is a trained cascaded neural network including a plurality of trained models that are sequentially connected, the plurality of trained models include a trained first model and at least one trained second model downstream to the trained first model, and during the application of the attenuation correction model, an input of each of the at least one trained second model includes the concatenated image and an output image of a previous trained model that is upstream and connected to the trained second model, and transmitting the attenuation-corrected PET image of the PET image subject to a terminal for display.

* * * * *